United States Patent [19]

Yamakawa

[11] Patent Number: 4,837,725
[45] Date of Patent: Jun. 6, 1989

[54] FUZZY MEMBERSHIP FUNCTION CIRCUIT

[75] Inventor: Takeshi Yamakawa, Kikuchi, Japan

[73] Assignee: Omron Tateisi Electronics Co., Kyoto, Japan

[21] Appl. No.: 917,952

[22] Filed: Oct. 14, 1986

[30] Foreign Application Priority Data

Oct. 22, 1985 [JP] Japan .................. 60-234644

[51] Int. Cl.$^4$ .................. G06G 7/12; H03K 19/20
[52] U.S. Cl. .................. 364/807; 307/207
[58] Field of Search .............. 364/807, 513; 307/207, 307/494, 201

[56] References Cited

U.S. PATENT DOCUMENTS 4,694,418  9/1987  Ueno et al. .................. 364/807
4,716,540 12/1987  Yamakawa .................. 364/807

OTHER PUBLICATIONS

J. van Amerongen, H. R. van Nauta Lemke and J. C. T. van der Veen, "An Autopilot for Ships Designed with Fuzzy Sets", Digital Computer Applications to Process Control (edited by van Nauta Lemke), North Holland, pp. 479-487 (1977).

Takeshi Yamakawa, "High-Speed Fuzzy Controller Hardware System" Proc. 2nd Fuzzy System Symposium, Japan, Jun. 16-18, pp. 122-130 (1986).

*Primary Examiner*—Jerry Smith
*Assistant Examiner*—Charles B. Meyer
*Attorney, Agent, or Firm*—Stevens, Davis, Miller & Mosher

[57] ABSTRACT

A programmable multi-membership function circuit comprises at least one or preferably two Z function circuits, at least one or preferably two S function circuits, and a fuzzy logic circuit for calculating fuzzy logic from the output of the Z function circuits and the output of the S function circuits. The fuzzy logic circuit comprises a MIN (intersection) circuit and a MAX (union) circuit, or the combination of these circuits.

18 Claims, 28 Drawing Sheets

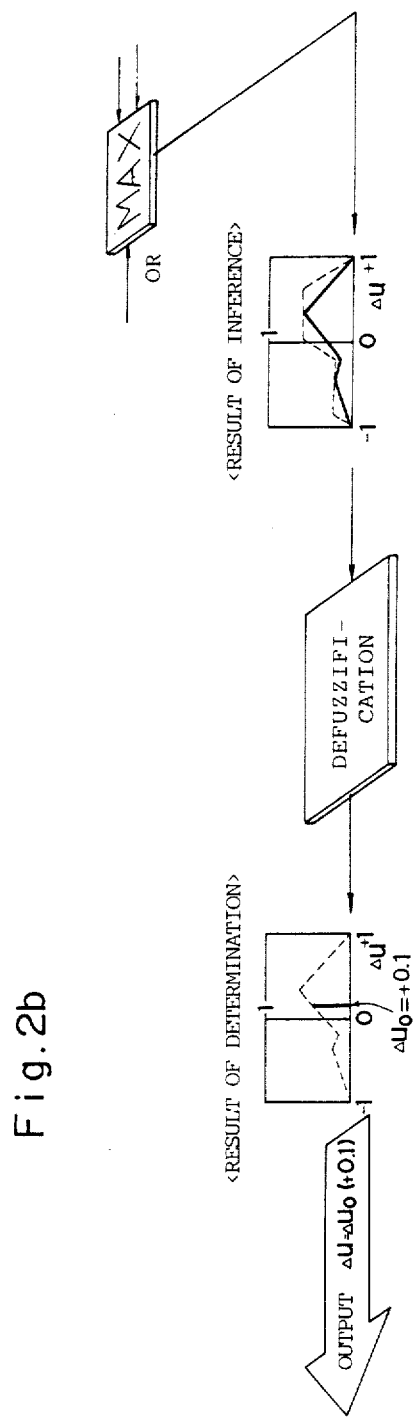

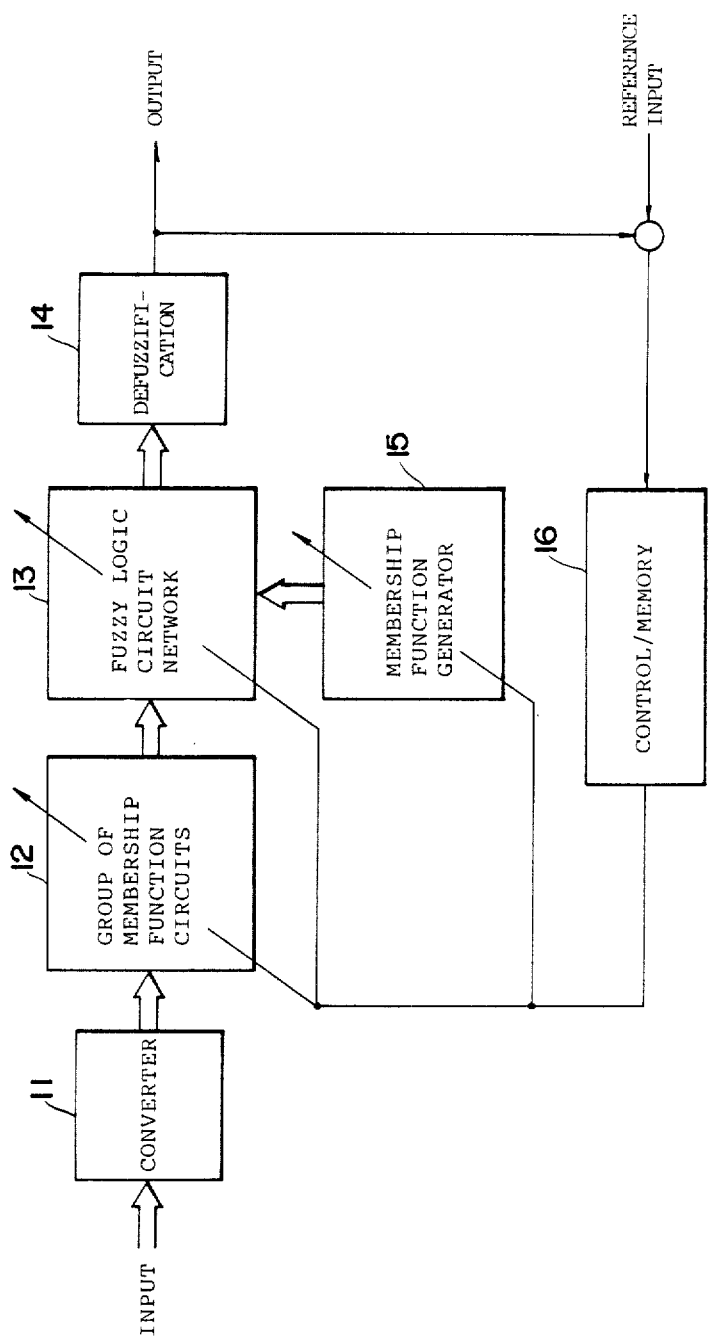

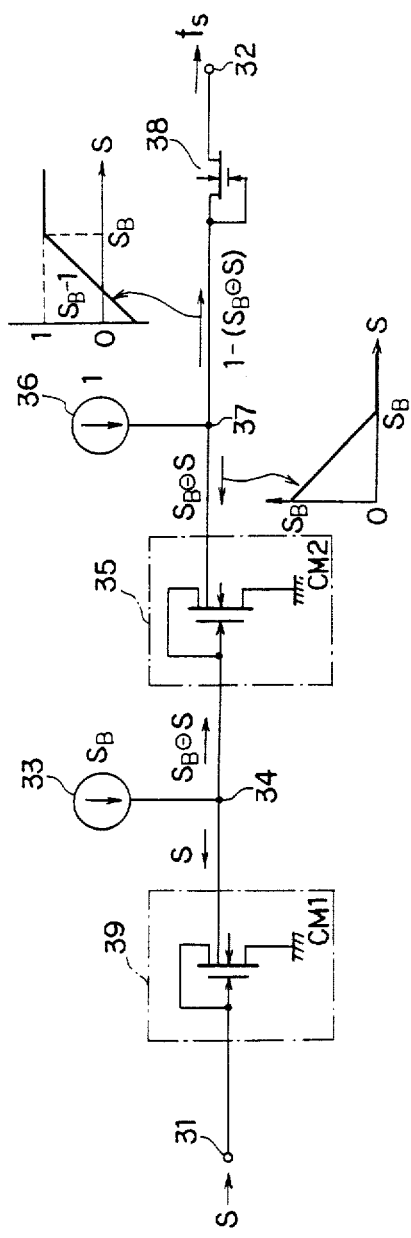
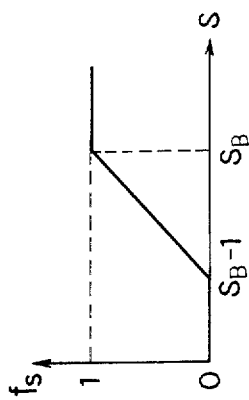
Fig.9
Fig.10

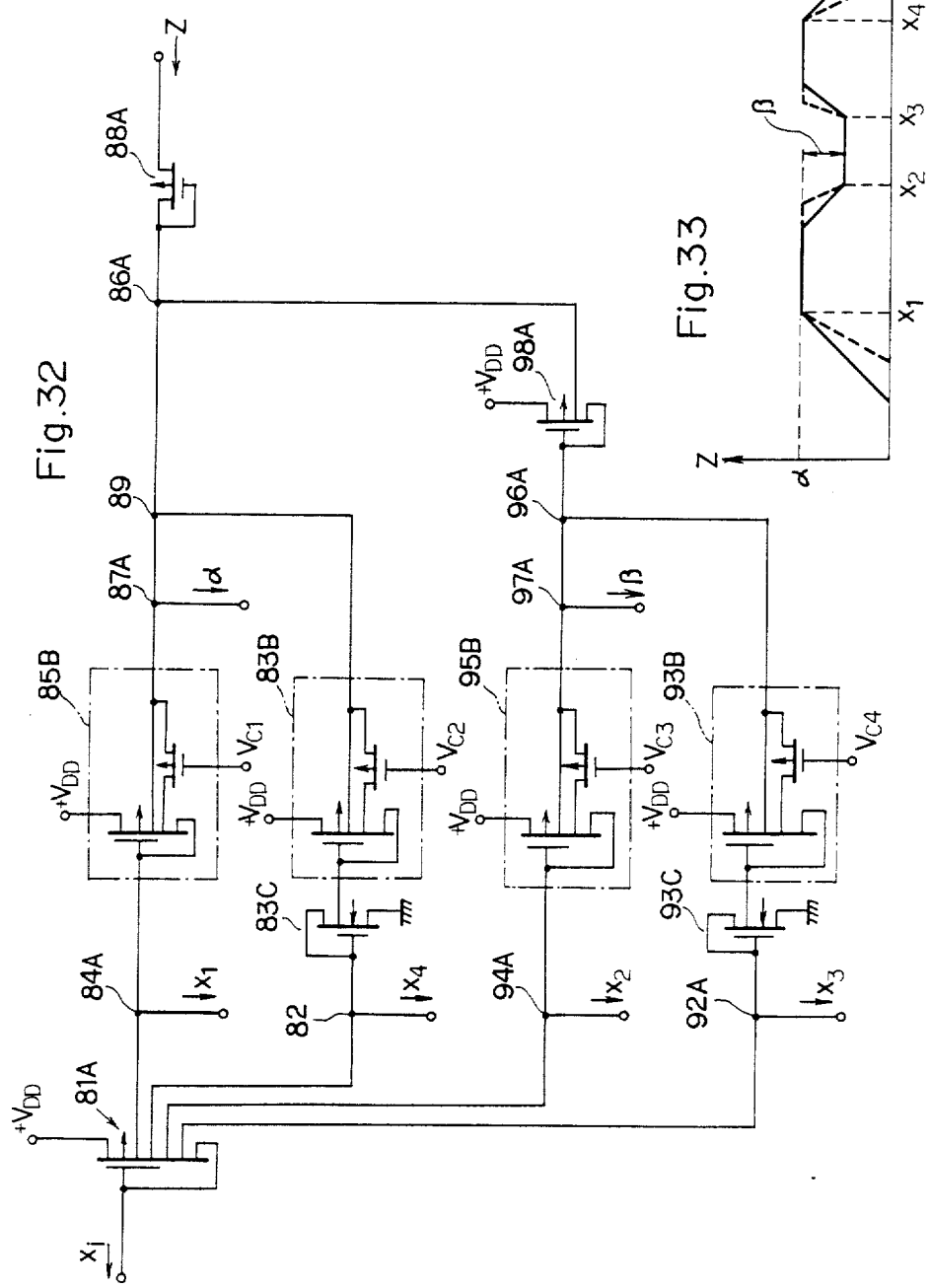

4,837,725

FUZZY MEMBERSHIP FUNCTION CIRCUIT

BACKGROUND OF THE INVENTION (1.1) Technical field

The present invention relates to fuzzy membership function circuits indispensable for constructing novel fuzzy control systems, and more particularly to fuzzy membership Z function circuits, fuzzy membership S function circuits, fuzzy logic circuits for use in composing other fuzzy membership function circuits based on these function circuits, programmable multi-membership function circuits thus composed for giving various membership function outputs in response to external control signals, etc.

(1.2) Limitation of digital computers and novel fuzzy logic circuits operable in current mode Fuzzy logic handles fuzziness, i.e. "vagueness." Human thought and behaviour involve vagueness. If such vagueness can be expressed in terms of numbers or amounts or theorized, the system will find application to the design of community systems such as traffic control systems, emergency or applied therapeutic systems and the like and to the design of robots simulating the human being. Ever since the concept of fuzzy sets was proposed by L.A. Zadeh in 1965, research has been conducted on fuzzy logic as a means for handling "vagueness" from the above viewpoint. However, many research efforts are presently directed to the application of the logic to software systems for use with digital computers. The digital computer is adapted to perform operation based on binary logic using 0 and 1. Although the operation is processed very strictly, there is a need to use an A/D converter circuit for feeding analog quantities. The computer therefore has the problem of requiring a long period of time to obtain the final result by processing a vast quantity of information. Further the programs for the application of fuzzy logic are bound to become complex and require a large-sized digital computer for complicated processing, hence poor economy.

Since fuzzy logic handles continuous values (0, 1) in the section of from 0 to 1, the logic is inherently incompatible with digital computers which operate on binary logic. Further because fuzzy logic handles vague quantities having a range, the strictness required thereof is not as high as is required of digital computers. Accordingly, it is desired to provide novel circuits which are suitable for handling fuzzy logic.

To meet the demand, the present inventor has already proposed many fuzzy logic circuits which operate in current mode (as disclosed, for example, in U.S. patent application Ser. No. 714,809) now U.S. Pat. No. 4,694,418. The fuzzy logic circuits proposed by the present inventor include bounded difference circuits, complete circuits, bounded-sum circuits, bounded-product circuits, union (MAX) circuits, intersection (MIN) circuits, absolute-difference circuits, implication circuits, equivalence circuits, etc. All of these circuits operate in current mode. All the above fuzzy logic circuits have the feature that the circuit comprises the combination of one or a plurality of bounded-difference circuits and addition (subtraction) circuit. Since addition and subtraction in current mode can be realized merely by wiring (wired sum or wired subtraction), it can be said that a fuzzy bounded-difference circuit is basically the sole component unit of all the foregoing fuzzy logic circuits. It therefore follows that the fuzzy logic circuit operable in current mode has many advantages in respect of the design of the circuit and fabrication of the circuit as an IC.

Membership function circuits and concept of fuzzy control system (FIGS. 1a, 1b, 2a and 2b)

A fuzzy set A is characterized by a membership function $\mu_A(x)$, which represents the degree with which the variable x belongs to the fuzzy set A. The degree is expressed by a continuous value [0, 1] in the section of from 0 to 1. An example of membership function $\mu_A(x)$ is shown in FIG. 1a.

Membership function circuits are so adapted that when an electric quantity (current or voltage) representing a variable x of certain value is given as an input, the circuit produces an electric quantity corresponding to the $\mu_A(x)$ representing the degree with which the variable x belongs to the fuzzy set A.

FIGS. 2a and 2b show an example of concept of a fuzzy control system comprising such a fuzzy logic circuit and membership function circuit.

Fuzzy control is considered useful, for example, for automating a system which has heretofore been operable or controlled by man based on rich experience and intuition. The control system heretofore handled by man, although very complex, can be simplified into the combination of some or many empirical rules. Briefly, such an empirical rule can be expressed as: "If p (state or the like) is q, then r state or the like) is s." This rule is more generalized when developed into a slightly complicated form: "If p is q and (or) p' is q', then r is s." Such a generalized form of empirical rule is called a control rule in fuzzy control systems.

According to the practice with feedback control systems, suppose the output e of the system to be controlled and the deviation $\Delta e$ thereof are control inputs, and the control output to be given to the system is $\Delta u$.

With reference to FIG. 2a, control rule 1, "If e is negative small and $\Delta e$ is positive small, then $\Delta u$ is positive small" is given as an example of control rule. This control rule 1 is expressed as follows.

$$e = NS \text{ and } \Delta e = PS \rightarrow \Delta u = PS$$

wherein NS means negative small, and PS means positive small.

Control rule 2 given is: "If e is positive small and $\Delta 2$ is negative small, then $\Delta u$ is negative small. This rule is expressed as follows.

$$e = PS \text{ and } \Delta e = NS \rightarrow \Delta u = NS.$$

Some other or many other control rules are also provided.

In judging "negative small e" in control rule 1, membership function $1_A$ (MS function $1_A$) answers the interrogation how the given control input $e = e_0$ is negative small. The membership function $1_A$ is obtained from a membership function circuit (not shown) and represents the degree the control input e belongs to a "set of negative small values." Given as the membership function $1_A$ in FIG. 2a is a triangular function having a peak at a negative value for e. The function indicates that the degree with which a control input $e = e_0 = -0.2$ belongs to the set is 0.8.

Similarly, FIG. 2a shows a membership function $1_B$ (MS function $1_B$) representing the degree with which the control input $\Delta e$ belongs to a "set of positive small values." This function $1_B$ is also triangular and has a peak when $\Delta e$ is a positive value. The membership function $1_B$ delivered from an unillustrated membership function circuit indicates that the degree with which a control input $\Delta e = \Delta e_0 = +0.1$ belong to this set is 0.6.

The condition "and" in control rule 1, "If e is negative small and $\Delta e$ is positive small" is generally calculated by a fuzzy interaction (MIN). More specifically, the calculation MIN selects the smaller of the two variables. Consequently, MIN selects 0.6 from the value 0.8 of the membership function $1_A$ and the value 0.6 of the function $1_B$.

The instruction that "$\Delta u$ is positive small" in control rule 1 is given also by a membership function (original instruction 1). The function representing the original instruction 1 and given as an example is also triangular and has a peak value 1 when $\Delta u$ is a positive value. The function representing the original instruction 1 is produced by a membership function generator circuit (not shown).

"If and then" in control rule 1 is executed, for example, by multiplication. Calculation MIN already provides the value 0.6. Multiplying the function of the original instruction by 0.6 gives a triangular function (instruction 1) having a peak value of 0.6.

The calculation for "if and then" may be conducted by MIN. In this case, a trapezoidal function indicated in a broken line will be obtained as the instruction 1.

An instruction 2 is similarly prepared by applying control rule 2 to the given control inputs e and $\Delta e$. Also similarly, other instructions will be prepared by applying other control rules.

Generally, a plurality of control rules are set for one system to be controlled as described above. The individual instructions derived from these control rules are used for eventually determining the control output $\Delta u$. Accordingly, fuzzy union (MAX) is calculated as to the instructions derived from the control rules. The graph "Result of Inference" in FIG. 2b shows the result of calculation MAX conducted for the instruction 1 and instruction 2. The solid line represents the result obtained by using multiplication for the condition "if and then" in each control rule, and the broken line the result obtained by using MIN for the condition "if and then".

The result of inference is used for eventually determining the control output $\Delta u$. This procedure is called defuzzification. While foregoing calculations including the generation of membership functions are performed with "vagueness" involved according to fuzzy logic, the control output $\Delta u$ having an established value must be determined in the final stage.

Defuzzification can be executed, for example, by calculating the weighted average of the functions representing the result of inference, i.e. the position of center of gravity. With the present embodiment, the control output $\Delta u = \Delta u_0 = +0.1$ is eventually obtained. A similar result will be obtained also when MIN is conducted for "if and then".

Defuzzification may be conducted by determining the position of center of gravity for the instruction 1 and that for the instruction 2 first and calculating the weighted average of these two positions.

It is desirable that the membership functions $1_A$, $1_B$, etc. be variable. While the contemplated system is being continuously controlled by the control output $\mu u$ thus determined, the system is monitored as to whether it is properly controlled. If the system is not controlled optimally, the membership fuctions (value and form of graph thereof) are altered to explore membership functions for realizing optimum control. This is generally termed "study function."

Concept of fuzzy system having study function (FIG. 3)

FIG. 3 schematically shows an example of fuzzy system having such a study function.

Some physical input, e.g. the above-mentioned control input, keyed-in data or the like, is normalized or converted to a signal of suitable form as required by an input converter circuit 11. The converter circuit 11 will not always be needed.

The system includes a group 12 of many parameter-variable membership function circuits. As least one specified circuit is selected according to an input signal from the converter circuit 11 for producing a membership function representing signal in accordance with the input signal.

On the other hand, a circuit 15 is provided for generating one or more membership functions. The membership function outputs from these circuits 12 and 15 are to a fuzzy logic circuit network 13, in which calculation is conducted according to the specified fuzzy logic to give the result as an output. It is desired that the logic for the circuit network 13 and the parameter for the membership function generator circuit 15 be alterable as required.

While the fuzzy data delivered from the fuzzy logic circuit network 13 may serve as an output as it is, the data will in some case be fed to a defuzzification circuit 14 where some determination is made, whereupon an output is delivered.

The output will be displayed, serve as the above-mentioned control output $\Delta u$ or be otherwise used for various purposes.

The output from the circuit network 13 or defuzzification circuit 14 is compared with a reference (standard) input. The reference input represents the correct result of study and will be given, for example, by a skilled operator, simulation by a digital computer or the like.

Based on the result of comparison, a control-memory circuit 16 changes the form of membership functions, parameters or the like of the circuit group 12 and the function generator circuit 15 or changes the kind of logic function of the network 13 or the internal connection of the network, so as to reduce the difference between the output and the reference input to zero.

In this way, the fuzzy system is adjusted and altered through study so as to give a correct output (correct solution) at all times.

SUMMARY OF THE INVENTION

Objects of the invention

An object of the present invention is to provide circuits for obtaining membership functions for use in the systems described in sections (1.3) and (1.4), i.e. membership function circuits, especially Z function circuits, suitable for fuzzy logic circuits operable in current mode and as stated in section (1.2).

Another object of the present invention is to provide fuzzy membership S function circuits.

Another object of the present invention is to provide fuzzy logic circuits for use in composing fuzzy membership functions suited to such fuzzy logic circuits.

Another object of the present invention is to provide programmable multi-membership function circuits for producing a membership function which is variable in accordance with an external control signal.

Still another object of the present invention is to provide fuzzy membership function circuits other than those mentioned above, and circuits useful for fuzzy membership function circuits.

Features of the invention

The Z function circuit of the present invention is characterized in that the circuit comprises a first current source for giving current $Z_B$ of a value relating to a break point, a bounded-difference circuit for calculating a bounded difference $Z \ominus Z_B$ by subtracting the output current $Z_B$ of the first current source from an input current Z, a second current source for giving a current representing a spcified grade $\alpha$ in fuzzy logic, a subtraction circuit for subtracting the output current $Z \ominus Z_B$ of the bounded-difference circuit from the output current $\alpha$ of the second current source, and a diode function device for blocking a negative-direction current included in output currents from the subtraction circuit.

The specified grade $\alpha$ is generally 1. When a multi-output current mirror is used as a current mirror for the bounded-difference circuit, with the output lines of the multi-output current mirror connected in parallel and with a switching device provided on at least one of the output lines, the slope of the Z function is changeable selectively.

The Z function is such that it exhibits the value $\alpha$ ($=1$) until the input Z reaches a break point $Z_B$ and then falls with a definite slope beyond the break point $Z_B$ to eventually decrease to 0 (see FIG. 6).

According to the present invention, an output current is obtained which represents the value $1 \times (Z \ominus Z_B)$ (negative-direction current is 0), so that the output current represents the Z function. Moreover, the Z function circuit operates in current mode.

The S function circuit of the present invention is characterized in that the circuit comprises a first current source for producing a current $S_B$ of a value relating to a break point, a bounded-difference circuit for calculating a bounded difference $S_B \ominus S$ by subtracting an input current S from the output current $S_B$ of the first current source, a second current source for producing a current representing the specified grade $\alpha$ in fuzzy logic, a subtraction circuit for subtracting the output current $S_B \ominus S$ of the bounded-difference circuit from the output current $\alpha$ of the second current source, and a diode function device for blocking a negative-direction current included in output currents from the subtration circuit.

The S function is such that it exhibits a value of 0 until the input S reaches a certain value, then rises with a definite slope beyond the certain value and eventually becomes $\alpha(=1)$ at a break point $S_B$ (see FIG. 10).

According to the invention, an output current is obtained which represents the value $1-(S_B \ominus S)$ (negative-direction current is 0), so that the output current represents the S function. Furthermore, the S function circuit operates in current mode.

As will become apparent from the description of embodiments, the Z function circuit and the S function circuit are basic circuits for producing many fuzzy membership functions and are very useful.

The programmable multi-membership function circuit of the present invention is characterized in that the circuit comprises at least one Z function circuit, at least one S function circuit and a fuzzy logic circuit for calculating the fuzzy logic of the output from the Z function circuit and the output from the S function circuit.

Preferably, a multi-fan-out circuit is provided for giving inputs of the same value to the Z function circuit and the S function circuit.

The fuzzy logic circuit comprises, for example, a MAX (union) circuit, MIN (intersection) circuit or the combination of these circuits.

The fuzzy logic circuit provided in its most developed form by the present invention for use in composing the desired fuzzy membership functions by calculating outputs from fuzzy membership function basic circuits (a pair of Z function circuits and a pair of S function circuits stated above) is characterized in that it compises a MIN (fuzzy intersection) circuit and a MAX (fuzzy union) circuit.

For example when the fuzzy logic circuit is a MIN circuit, the programmable multi-membership function circuit stated above affords $\phi$ function, 1 function, Z function, S function and $\pi$ function outputs.

Further when the fuzzy logic circuit is a MAX circuit, the programmable multi-membership function circuit provides $\phi$ function, 1 function, Z function, S function and U function outputs.

Further when the present invention is developed into the above-mentioned circuit comprising two Z function circuits and two S function circuits, a wider variety of membership functions can be produced. In this case, the output of the first Z function circuit and the output of the first S function circuit are fed to the MIN (or MAX) circuit, and the output of the second Z function circuit, the output of the second S function circuit and the output of the MIN (or MAX) circuit are fed to the MAX (or MIN) circuit. It is then possible to obtain from the MAX (or MIN) circuit outputs representing 9 kinds of membership functions in current mode.

The above-mentioned $\phi$ function, 1 function, Z function, S function, $\pi$ function, U function and other functions will be defined in detail in the description of embodiments to follow.

According to the present invention, various fuzzy membership functions can be produced in response to external control inputs as stated above, hence great usefulness for the foregoing fuzzy control system. Furthermore, the programmable multi-membership function circuit operates in current mode.

The fuzzy logic circuit of the most developed type makes it possible to compose many fuzzy membership functions including complex ones, when used in combination with fuzzy membership function basic circuits and is therefore very useful for the foregoing fuzzy control system.

Other features of the present invention will become apparent from the following description of embodiments with reference to the accompanying drawings.

BRIEF DESCRIPTION OF THE DRAWINGS

FIGS. 2a and 2b illustrate the concept of a fuzzy control system;

FIG. 3 is a block diagram showing the concept of a fuzzy system having a study function;

FIG. 9 is a diagram showing an S function circuit comprising MOS FETs;

FIG. 10 is a graph showing the input-output characteristics of the circuit;

FIG. 32 is a diagram showing an expanded programmable multi-membership function circuit having a slope changing function;

FIG. 33 is a graph showing the input-output characteristics of the circuit;

DESCRIPTION OF EMBODIMENTS

Figure 4A:
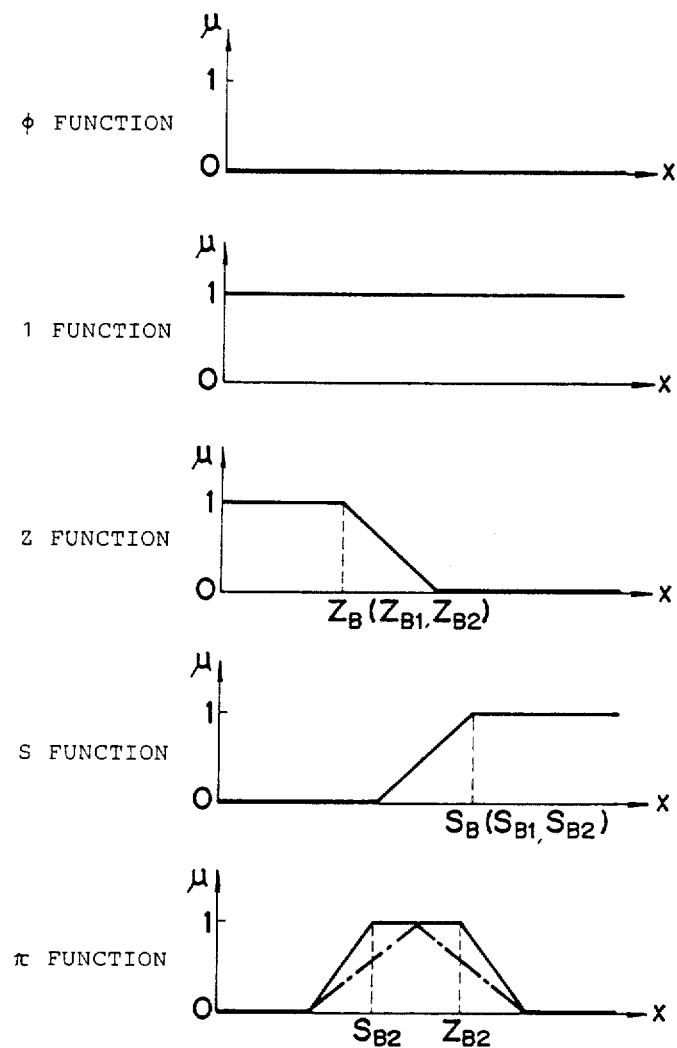
FIGS. 4a and 4b are graphs showing various types of membership functions.
Figure 4B:
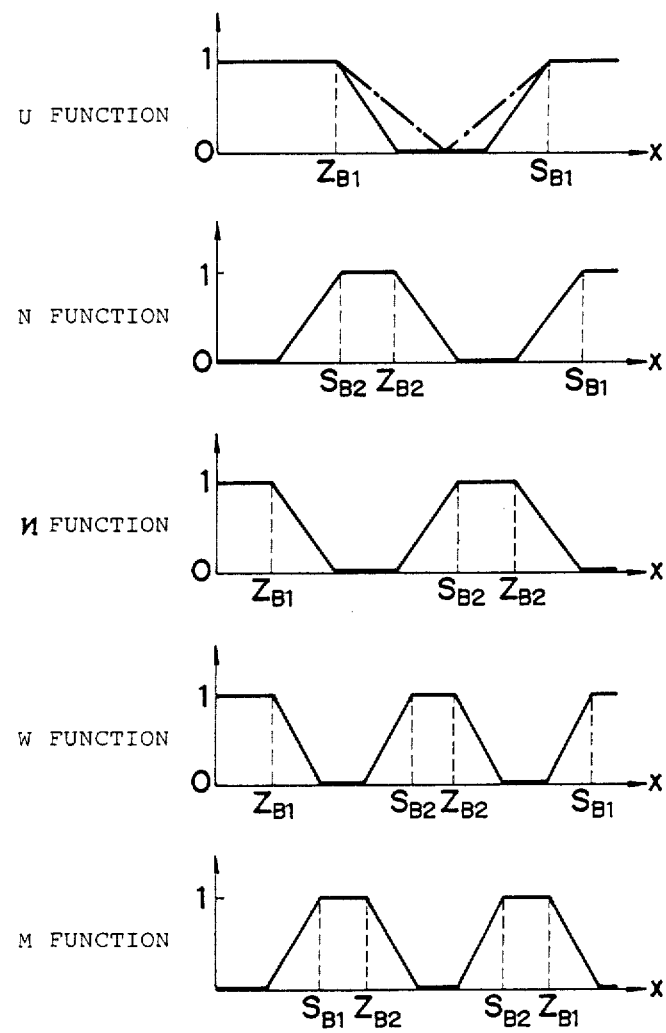

Various types of membership functions and the definitions thereof (FIGS. 4a and 4b)

Figure 1A:
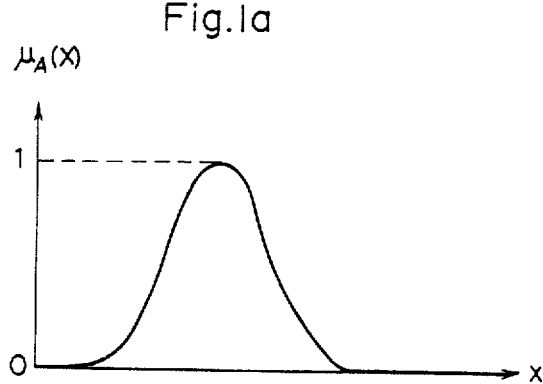
FIG. 1a shows a common membership function.

Membership functions are generally represented by curves as illustrated in FIG. 1a showing an example. However, it is not a substantial matter for the membership function whether it is to be represented by a curve. More importantly, the membership function is characterized in that the function has a continuous value of from 0 to 1.

Figure 1B:
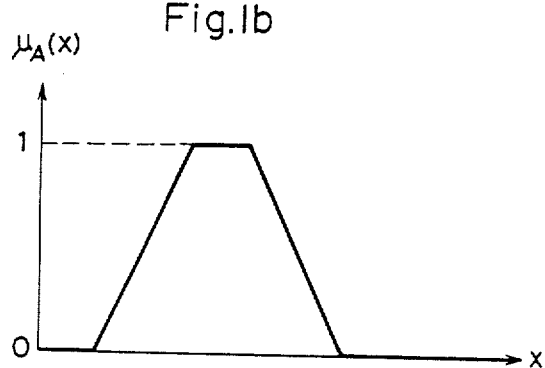
FIG. 1b shows an actual membership function simulated by a line.
Figure 2A:
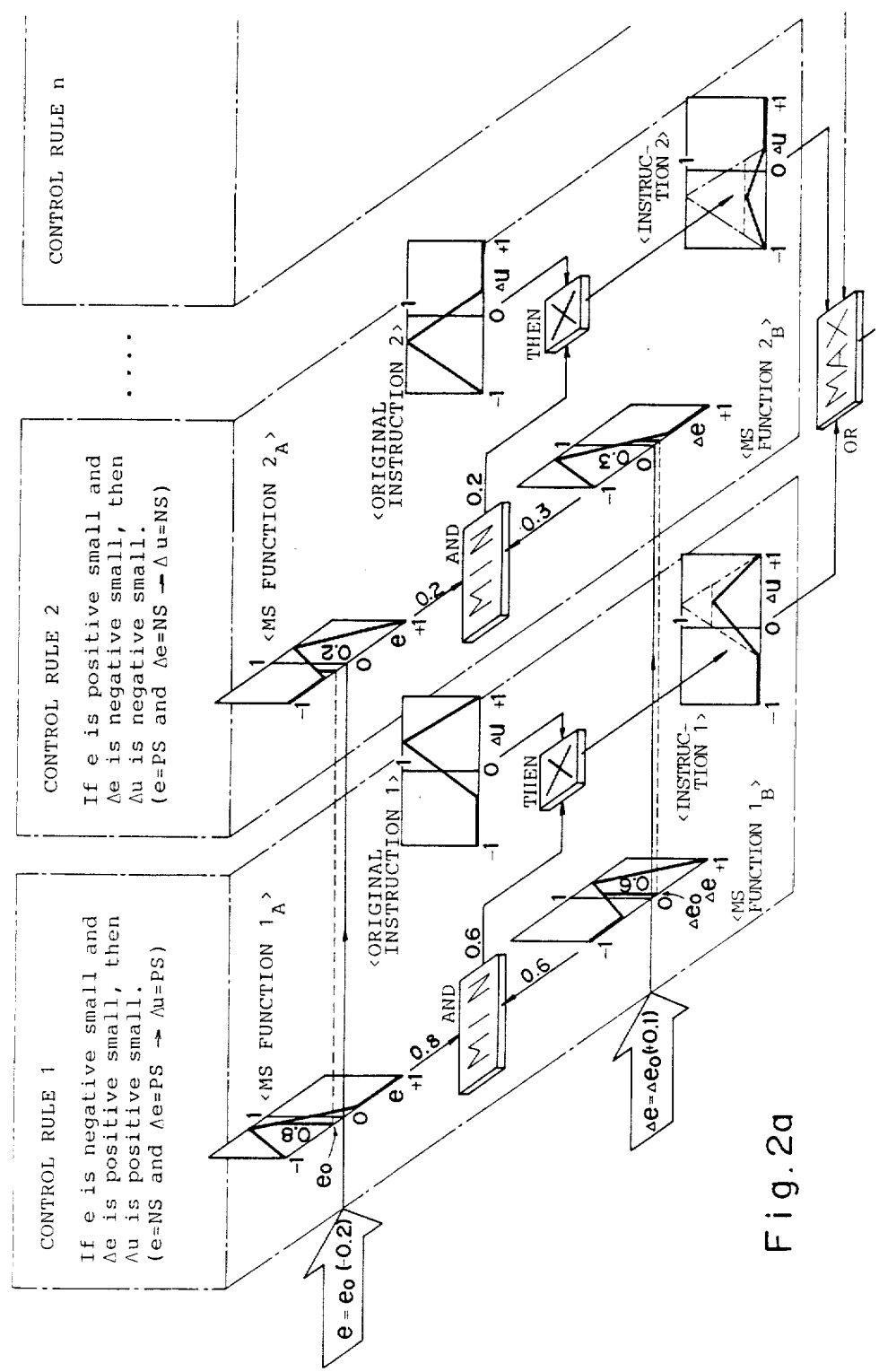

From the viewpoint of circuit design, the membership function is easy to handle when represented by a polygonal line composed of straight line segments as seen in FIG. 1b. The function can then be characterized by a few parameters, and the circuit therefor is easy to design. Further even if the membership function is represented by a polygonal line, the characteristics thereof will not be lost.

In the description to follow, all the membership functions will be represented by straight lines or polygonal lines comprising straight line segments.

FIG. 1b merely shows an example of membership function. There are many other types of membership functions as will be defined below.

FIG. 4a and 4b show ten kinds of membership functions.

The first is a function which always has a value of 0 irrespective of the value of variable x. This function is defined as $\phi$ function.

The second is defined as 1 function which always has a value of 1.

The third has a value of 1 in the region where a variable x is small, decreases with a definite slope as x increases beyond a value of $Z_B$ to eventually reach 0 and remains 0 when x is further greater. Thus, the function has a downward slope along the axis of the variable x. This function is termed Z function. The point where $x = Z_B$ is called a break point. The slope can be an optional value. The Z function is defined by the break point $Z_B$ and the slope. $Z_B$ of the Z function can be equal to or smaller than 0.

The fourth is an inverted form of Z function and is defined as S function. This function has an upward slope on the x axis. The S function is defined also by the break point $S_B$ and the slope.

The fifth, termed $\pi$ function has a value of 1 when a variable x is in a certain range, decreases with a definite slope as x decreases from a break point $S_{B2}$ or increases from $Z_{B2}$ to eventually reach 0 and remains 0 when x is further smaller or greater. The function can be said to be a trapezoidal function. The $\pi$ function is characterized by the two break points $S_{B2}$ and $Z_{B2}$ and the slopes.

In a special case, $S_{B2} = Z_{B2}$, and the function is then triangular as indicated in a dot-and-dash line.

The sixth is an inverted form of $\pi$ function, termed U function and has one furrow. The U function is defined by the two break points $Z_{B1}$ and $S_{B1}$ and the slopes. In a special case, the function assumes the form indicated in a dot-and-dash line ($Z_{B1} = S_{B1}$).

Other membership functions have a complex form.

The seventh comprises a trapezoidal function ($\pi$ function) and an upwardly sloped function (S function) combined therewith in a region where x is greater than in the trapezoidal form. This function is defined as N function. In other words, this function comprises a furrowed function (U function) and an upwardly sloped function (S function) in a region where x is smaller than in the former. The N function is defined by three break points $S_{B2}$, $Z_{B2}$ and $S_{B1}$, and the slopes.

The eighth is an inverted form of N function and is defined as И function. This function is defined also by three break points $Z_{B1}$, $S_{B2}$ and $Z_{B2}$ and the slopes.

The ninth, which is called W function, can be said to be combination of two furrowed functions (U functions), the combination of trapezoidal function ($\pi$ function), downwardly sloped function (Z function) and upwardly sloped function (S function), the combination of N function and Z function, or the combination of И function and S function. The W function is defined by four break points $Z_{B1}$, $S_{B2}$, $Z_{B2}$ and $S_{B1}$ and the slopes.

The last is an inverted form of W function and called M function. This function is defined also be four break points of $S_{B1}$, $Z_{B2}$ $S_{B2}$ and $Z_{B1}$ and the slopes.

It will be readily understood that a membership function of more complex form can be defined by a suitable combination of at least two of the foregoing functions.

Although the positive region only of the variable x is illustrated in FIGS. 4a and 4b, the variable can of course be present also in the negative region. In this case, the break point can generally be a negative value.

While the upward slope, downward slope, and the slope of trapezoidal, furrowed or other form can be optional, such a slope is most simply 1 or −1 in view of circuit design. Even when the slope is 1, an optional slope can be obtained by varying the range of ordinate and abscissa when the circuit is used as will be described later. If the slope is predetermined, the above ten functions can be determined straightforwardly by determining one or more break points.

Z function circuits (FIGS. 5 to 8)

Figure 5:
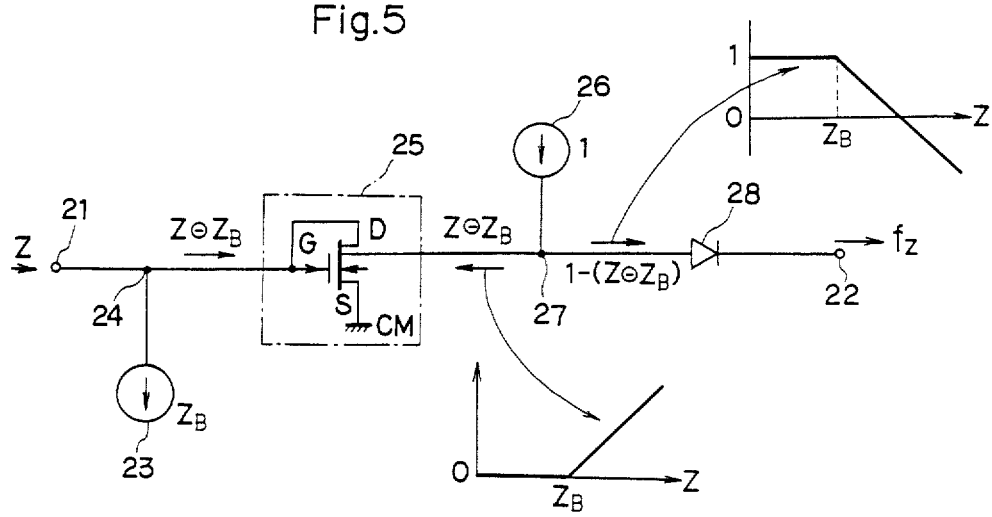
FIG. 5 is a diagram showing a Z function circuit comprising MOS FETs.

FIG. 5 shows an example of membership function circuit for giving a Z function output. The input variable is represented by Z, and the Z function by $f_Z$. The circuit operates in current mode and is of the inflow input and outflow output type. The term inflow input refers to the mode in which an input current flows into the circuit, and the term outflow output to the mode in which an output current flows out from the circuit. In current mode, the positive or negative of the variable, as well as the function, is represented by the direction of current, and the absolute value thereof by the current value.

Figure 6:
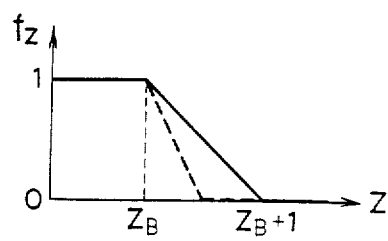
FIG. 6 is a graph showing the input-output characteristics of the circuit.

The membership Z function circuit of FIG. 5 comprises a current source 23 for giving a current representing a break point $Z_B$ (for giving and outflow input current to the circuit), a current mirror (CM) 25, a current source 26 for giving a curernt of a value 1 (for giving an inflow input current to the circuit) and a diode 28. The current mirror 25 is composed of two N-MOS FETs. The currents flowing through portions of the circuit of FIG. 5 are shown in corresponding relation with the arrows indicating the directions of the currents, in the graphs included in FIG. 5. FIG. 6 is a graph showing the output current $f_Z$.

A current representing the value of input variable Z ($Z \geq 0$) flows into an input terminal 21. Via a wired OR 24, the current source 23 is connected to an intermediate point between the input terminal 21 and the input side of the current mirror 25. A current of the value $Z_B$ ($Z_B \geq 0$) flows out from the wired OR 24. Consequently, a current representing the difference between Z and $Z_B$, i.e. $Z - Z_B$, tends to flow from the wired OR 24 toward the current mirror 25. In actuality, however, the current mirror 25 acts as a current blocking diode on the reverse current, so that a current of bounded difference $Z \ominus Z_B$ flows (see the graph). The mark $\ominus$ represents calculation for the fuzzy bounded difference, which means the following.

$$Z \ominus Z_B = \begin{cases} Z - Z_B & Z > Z_B \\ 0 & Z \leq Z_B \end{cases} \quad (1)$$

An inflow current of the same value is delivered from the output side of the current mirror 25. The current source 26 is connected to an intermediate point between the output side of the current mirror 25 and an output terminal 22 via a wired OR 27, which therefore calculates $1 - (Z \ominus Z_B)$. A current of this value tends to flow out from the output terminal 22 or to flow thereinto (see the corresponding graph). However, a diode 28 which is forward with respect to the outflow output is connected between the wired OR 27 and the output terminal 22, so that the inflow output current which tends to appear at the terminal 22 is zero. This is equivalent to the calculation of $1 \ominus (Z \ominus Z_B)$.

The above operation will be summarized as follows.

$$f_Z = \begin{cases} 1 & (Z \leq Z_B) \\ 1 - (Z - Z_B) & (Z_B < Z \leq Z_B + 1) \\ 0 & (Z > Z_B + 1) \end{cases} \quad (2)$$

This operation is shown in FIG. 6. The downward slope of this Z function is −1.

The diode 28 can be replaced by a diode-connected MOS FET.

When the input current Z is negative (provided that $Z_B \geq 0$), a current representing $Z + Z_B$ tends to flow from the current mirror 25 toward the wired OR 24, but the current mirror 25 prevents the outflow of this current, with the result that zero current flows between the mirror 25 and the wired OR 24. Consequently, the output current from the mirror is zero, and the current of the value 1 from the current source 26 directly flows out from the output terminal 22.

If the break point $Z_B$ is negative (provided that $Z \geq 0$), a current of $Z + |Z_B|$ flows from the wired OR 24 into the current mirror 25, so that the inflow output current of the mirror 25 is $Z + |Z_B|$. The output is therefore represented as follows.

$$f_Z = \begin{cases} 1 - (Z + |Z_B|) & (1 > Z + |Z_B|) \\ 0 & (1 \leq Z + |Z_B|) \end{cases} \quad (3)$$

The formula (3) represents the operation of FIG. 6 as shifted leftward to position $Z_B$ in the negative side.

When both the break point $Z_B$ and the input current Z are negative, a current of $|Z_B| \ominus |Z|$ flows from the wired OR 24 toward the current mirror 25. Accordingly, the inflow output current of the mirror 25 is given also by $|Z_B| \ominus |Z|$, and the outflow output current is represented as follows.

$$f_Z = \begin{cases} 1 & (|Z| \geq |Z_B|) \\ 1 - (|Z_B| - |Z|) & (|Z_B| - 1 \leq |Z| < |Z_B|) \\ 0 & (|Z| < |Z_B| - 1) \end{cases} \quad (4)$$

The formula (4) also shows the operation represented by the graph of FIG. 6 as shifted leftward.

Thus, the circuit of FIG. 5 is applicable to all values of Z and $Z_B$ irrespective of whether they are positive or negative.

Figure 7:
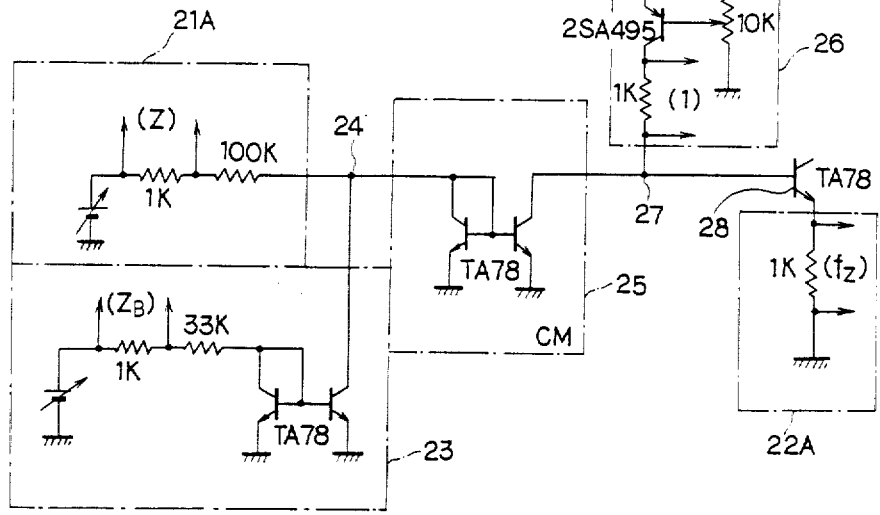
FIG. 7 is a diagram showing a Z function circuit comprising a bipolar transistor array for measuring input-output characteristics.

FIG. 7 shows a Z function circuit realized using a bipolar transistor array (TA78, product of ROHM). Throughout FIG. 5 and 7, like parts are designated by like reference numerals. The input terminal 21 of FIG. 5 is replaced by an input circuit 21A, and the output terminal 22 by an output circuit 22A. Used as the diode 28 is the diode between the base and the emitter of an NPN transistor (one included in TA78).

Figure 8:
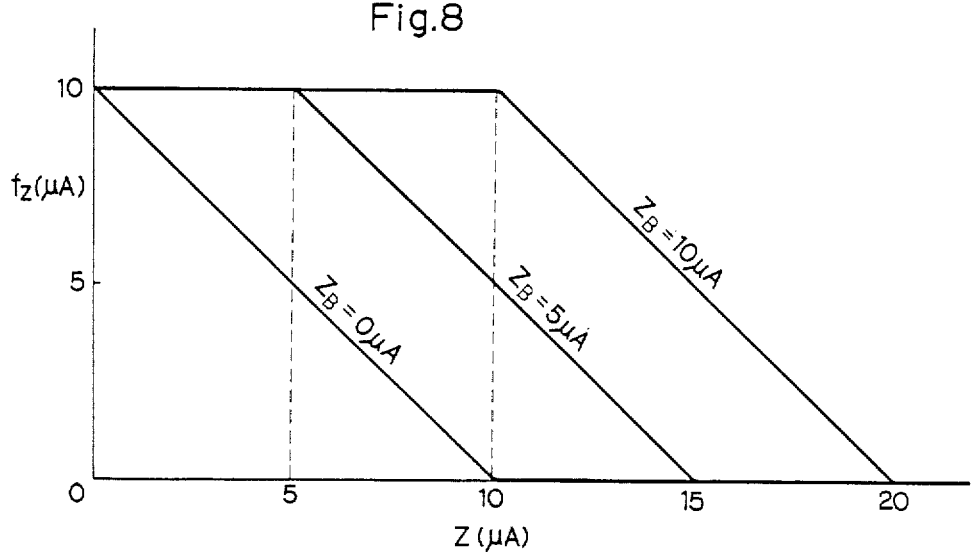
FIG. 8 is a graph showing the input-output characteristics measured.

FIG. 8 shows the result of an experiment conducted with use of the circuit of FIG. 7 and using three different $Z_B$ parameters. The input current Z, break point current $Z_B$, current of value 1 and output current $f_Z$ were each measured in terms of the voltage reduction achieved by the resistance of the circuit concerned. $f_Z = 10\ \mu A$ corresponds to $\mu = 1$, and $f_Z = 0\ \mu A$ to $\mu = 0$.

The graph reveals that the circuit of FIG. 7 has very excellent linearity, while the circuit is simple in construction. It is impossible to achieve such outstanding linearity by a simple circuit of voltage mode, and this is a great reason why the memebership function circuit is realized in current mode. The circuit of FIG. 7 has high temperature stability because a current mirror is used and is suited to integration because no resistor is used except at the current sources. These are the features of the circuit.

FIGS. 7 and 8 also indicate that a Z function circuit can be realized with high usefulness using not only MOS FET but also a bipolar device.

S function circuits (FIGS. 9 to 12)

FIG. 9 shows an example of membership S function circuit. The input variable (input current) is represented by S, and S function output (output current) by $f_S$. A current $S_B$ representing a break point is given by a current source 33, and a current of value 1 by a current source 36.

The S function circuit differs from the Z function circuit basically in the direction of current fed to a wired OR 34 (corresponding to the wired OR 24 in FIG. 5). Given to the wired OR 34 are the input current S as an outflow input and the break point current $S_B$ as an inflow input. Accordingly, the inflow input current given by an input terminal 31 has its direction reversed by a current mirror 39. Further the break point current source 33 gives an inflow input to the circuit (cf. the current source 23 of FIG. 5).

The wired OR 34 and a current mirror 35 compute $S_B \ominus S$. A wired OR 37 further calculates $1 - (S_B \ominus S)$. A diode-connected MOS FET 38 acting as a diode blocks the current in the direction of inflow output, with the result that an outflow output current representing $f_S = 1 \ominus (S_B \ominus S)$ is obtained as the output current, which is shown in FIG. 10.

Although the break point $S_B$ can be set to a negative value in this S function circuit, the output current $f_S$ always has a value of 1 in the region of $S \geq 0$ when $S_B < 0$, so that setting of $S_B$ to a negative value has no particular significance. Thus, $S_B = 0$ suffices.

Figure 11:
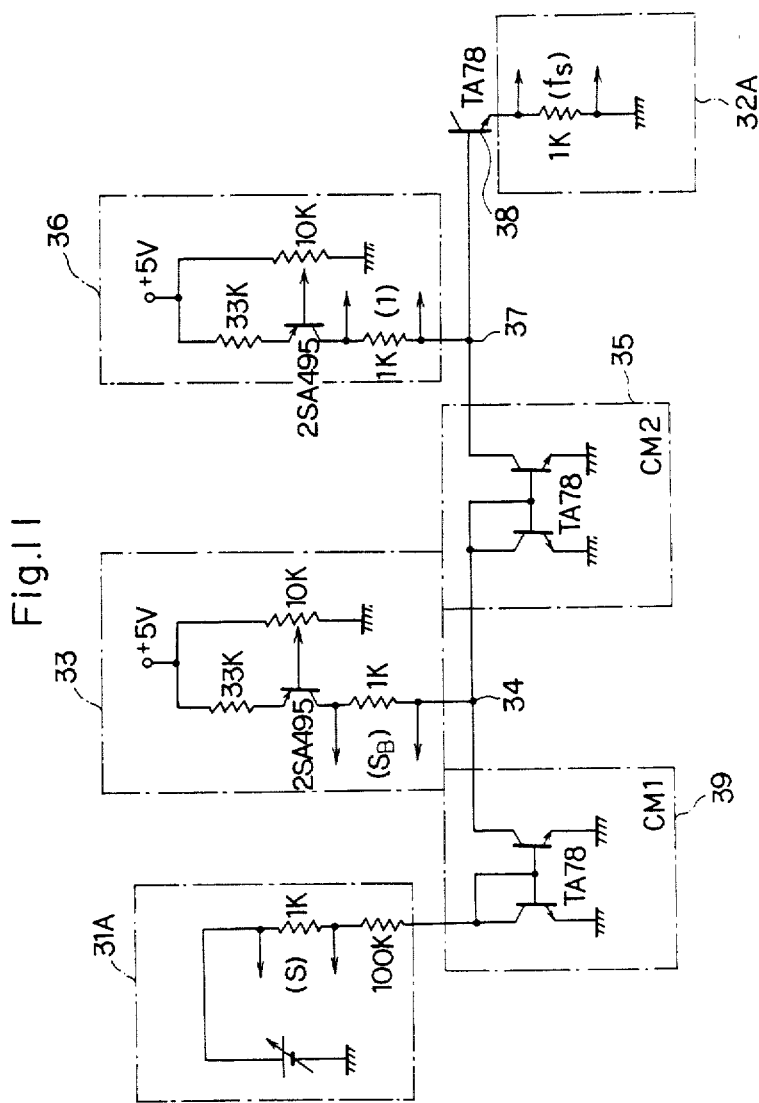
FIG. 11 is a diagram showing an S function circuit comprising bipolar transistors for determining input-output characteristics.
Figure 12:
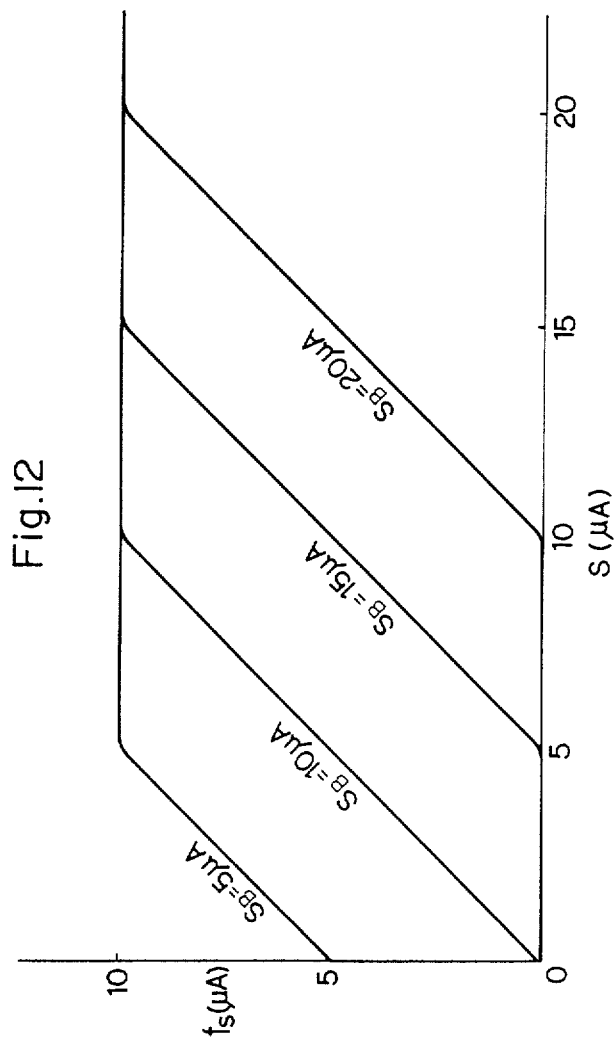
FIG. 12 is a graph showing the characteristics determined.

FIG. 11 shows an S function circuit comprising bipolar transistors. In FIGS. 9 and 11, like parts are designated by like reference numerals. An input circuit 31A coresponds to the input terminal 31, and an output circuit 32A to the output terminal 32. FIG. 12 shows the characteristics of the circuit of FIG. 11 measured using $S_B$ parameters. It is seen that this S function circuit also has outstanding linearity.

Optional setting of slope for use (FIGS. 13a, 13b, 14a, 14b and 14c)

Generally in discussing membership functions, an input value of physical quantity is normalized using a maximum value thereof (or allowable value of the circuit), and the normalized value is used as the input value as shown in the converter circuit 11 of FIG. 3. For example in handling the height of man, H, input of height is normalized by H/Hmax using a maximum Hmax (e.g. 2 m) thereof.

Figure 13A:
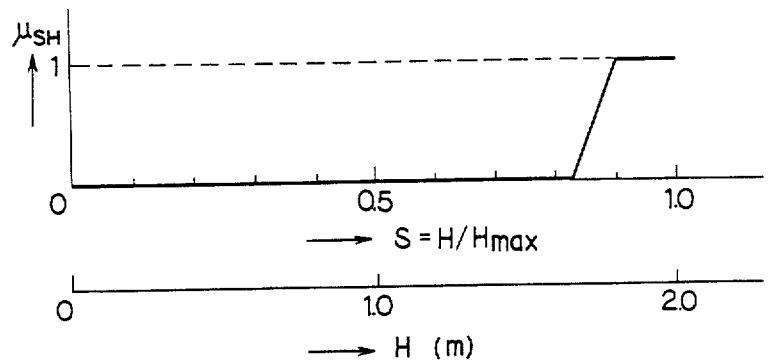
FIGS. 13a and 13b are graphs showing actual examples of membership functions.
Figure 13B:
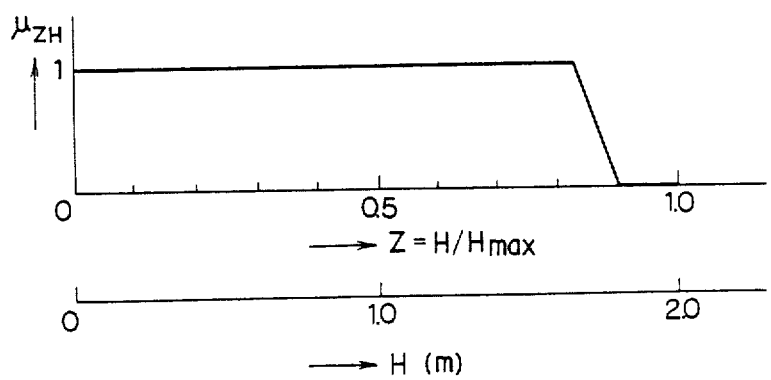

As an example, FIG. 13a shows a membership function $\mu_{SH}$ for a set of "tall persons" as an S function, and FIG. 13b shows a membership Z function $\mu_{ZH}$ for a set of "low persons." The abscissas (variables) of these membership functions are expressed as S=H/Hmax and Z=H/Hmax.

On a circuit therefore, the actual slopes of the membership functions, i.e. the upward slope of the S function and the downward slope of the Z function, can be set optionally depending on what $\mu A$ the maximum Hmax is made to correspond to and what $\mu A$ grade 1 of the function is made to correspond to. Although the slope of output current/input current is always $-1$ or 1 in the Z and S function circuits described and comprising a current mirror, a desirable slope is available in this way.

Figure 14A:
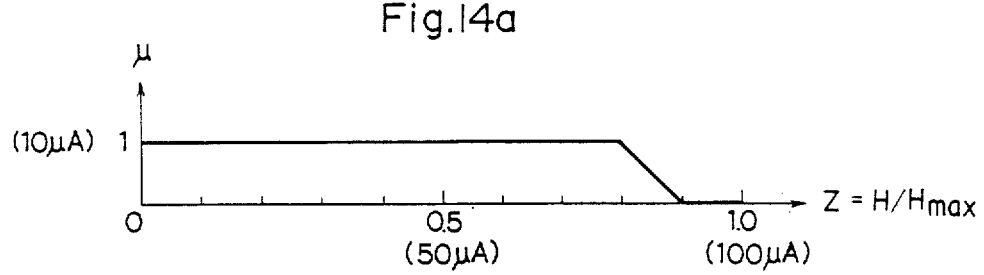
FIGS. 14a, 14b and 14c are graphs showing how the desired slope can be set depending on the corresponding relation of membership function and variable thereof with the input-output current of the circuit.
Figure 14B:
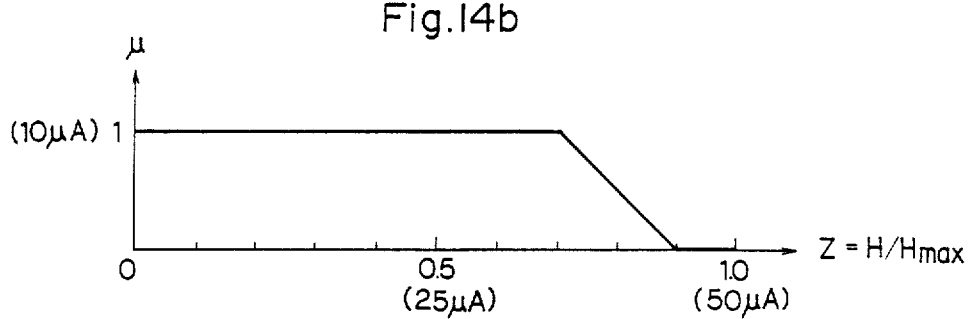
Figure 14C:
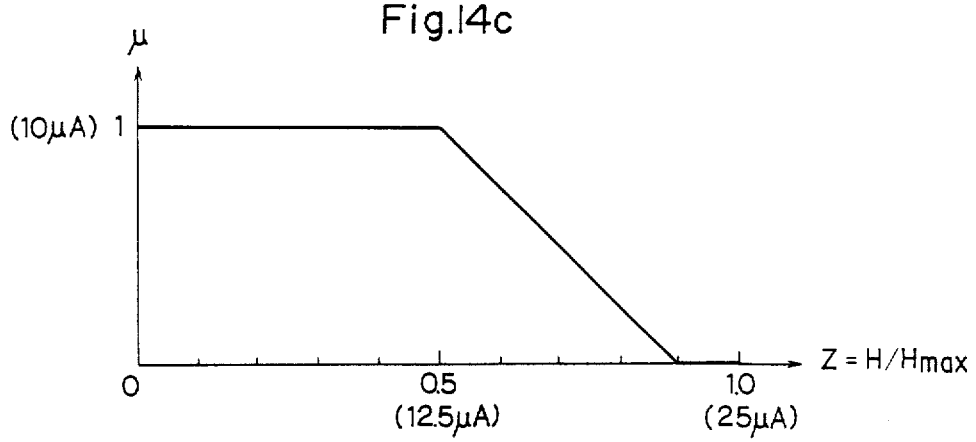

FIGS. 14a to 14c show Z functions having substantially altered slopes. More specifically, FIG. 14a shows a membership function for the set of "low persons" with Hmax corresponding to 100 $\mu A$ and grade 1 to 10 $\mu$. The slope of the membership function can be changed to ½ by making Hmax correspond to 50 $\mu A$ as seen in FIG. 14b, or to ¼ by making Hmax correspond to 24 $\mu A$ as shown in FIG. 14c.

Thus, the slope, even when fixed to $+1$ or $-1$ in the membership function generator circuit, is optionally changeable depending on how to actually use the function.

Control for changing slope (FIGS. 15 to 18)

The slope of membership functions is also changeable depending on the circuit design as will be described below.

Figure 15:
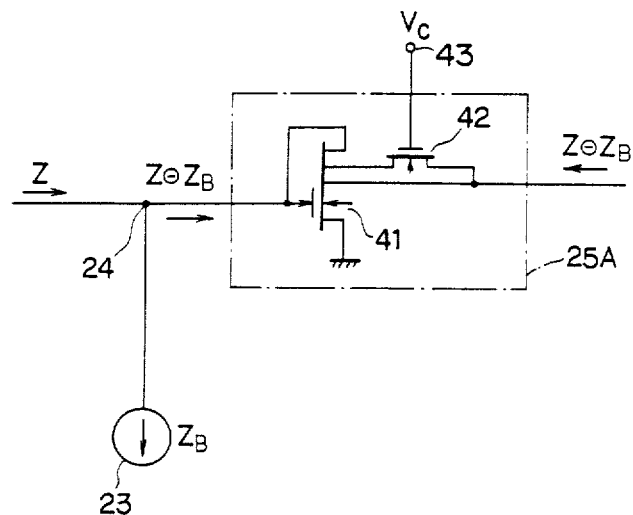
FIG. 15 is a fragmentary diagram showing a Z function circuit adapted to select one of two slopes.

FIG. 15 shows the portion of the Z function circuit of FIG. 5 including the current source 23, wired OR 24 and current mirror 25, with the mirror 25 modified to a current mirror 25A.

The current mirror 25A comprises a current mirror 41 having two output drains which are equal in area, and an N-MOS FET 42 for switching the parallel connection of these two output drains. The FET 42 is on-off controlled by a control signal $V_C$ given to a control terminal 43.

Figure 16:
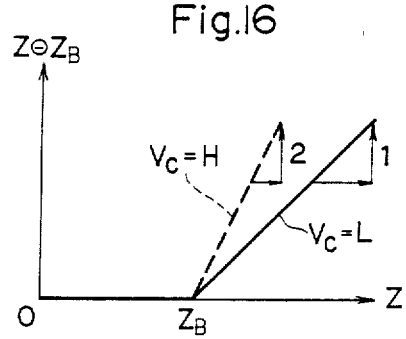
FIG. 16 is a graph showing the input-output characteristics of the circuit.

The output signal $Z \ominus Z_B$ of the current mirror 25A is shown in FIG. 16. When the control signal $V_C$ has L level, the FET 42 is off, permitting the mirror 25A to deliver an output current with a slope 1. In this case, the current mirror 25A has the same function as the mirror 25 of FIG. 5. When the control signal $V_C$ is changed to H level, FET 42 is on, permitting current to flow through the two output drains and consequently giving a twofold output current, hence a slope of 2.

Accordingly, use of the current mirror 25A in place of the current mirror 25 in FIG. 5 realizes a Z function circuit wherein one of two slopes is selectable according to the level of the control signal $V_C$. The thick broken line in FIG. 6 shows the input-output characteristics of the Z function circuit with the slope 2.

Figure 17:
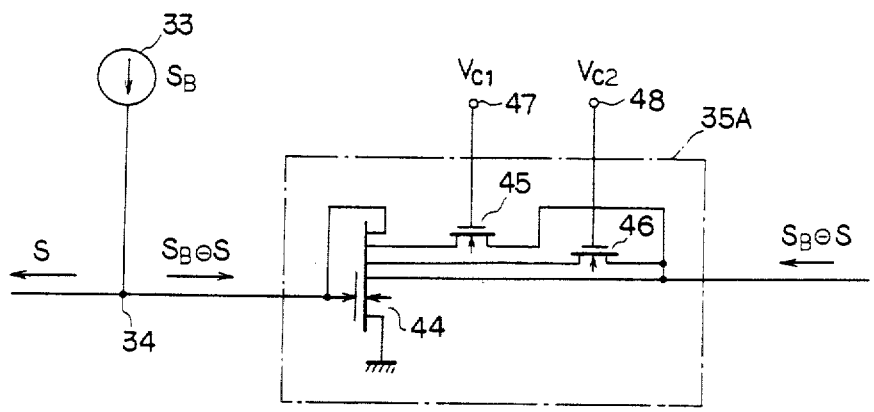
FIG. 17 is a fragmentary diagram showing an S function circuit adapted to select one of three slopes.

The changeable slopes are not limited to two, but one of a desired number of slopes is selectively available. FIG. 17 shows a portion of the S function circuit of FIG. 9, with the current mirror 35 replaced by a current mirror 35A. The mirror 35A includes a current mirror 44 having three output drains which are connected in parallel. FETs 45 and 46 serving as switching devices are connected to two of these output drains and are on-off controlled by control signals $V_{C1}$ and $V_{C2}$ given to their control terminals 47 and 48.

Figure 18:
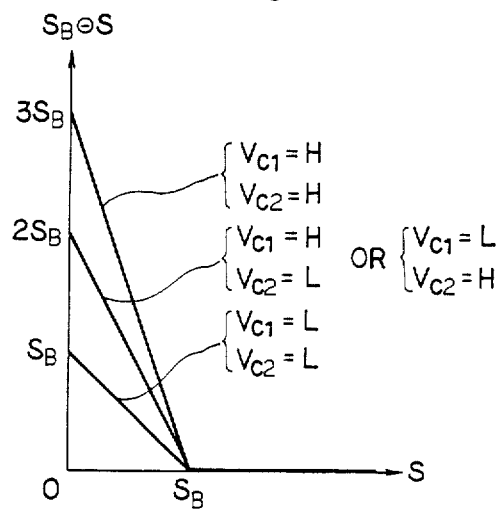
FIG. 18 is a graph showing the input-output characteristics of the circuit.

With reference to FIG. 18, the output current has a slope of $-1$ when both the FETs 45, 46 are off ($V_{C1}=V_{C2}=L$). The slope is $-2$ when one of them is on ($V_{C1}=H$ and $V_{C2}=L$, or $V_{C1}=L$ and $V_{C2}=H$), or is $-3$ when both are on ($V_{C1}=V_{C2}=H$).

Programmable multi-membership function circuits (FIGS. 19, 20, 21a and 21b)

Figure 19:
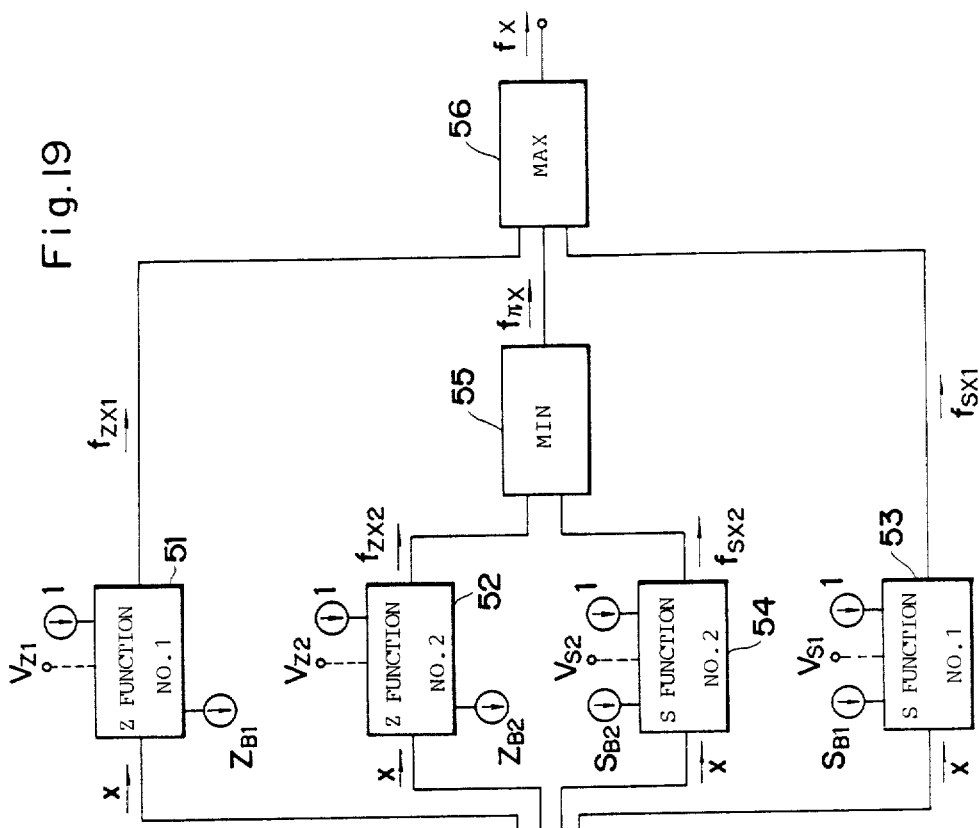
FIG. 19 is a block diagram showing an example of programmable multi-membership function circuit.

Of the ten fuzzy membership functions, the nine functions other than M function are programmable (or controllable from outside) as desired by the multi-membership function circuit shown in FIG. 19. This function circuit comprises a multi-fan-out circuit 50, a first Z function circuit (No. 1) 51, a second Z function circuit (No. 2) 52, a first S function circuit (No. 1) 53, a second S function circuit (No. 2) 54, a MIN (fuzzy logic intersection) circuit 55 and a MAX (fuzzy logic union) circuit 56. The variable (input) is given by x, and the function (output) eventually obtained by $f_x$.

Figure 20:
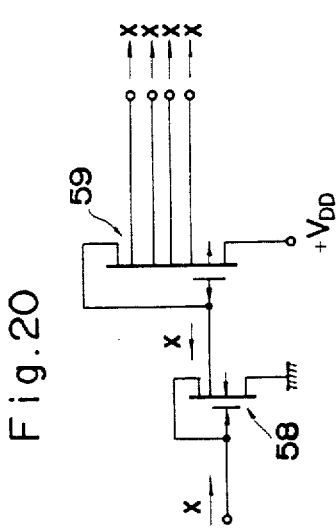
FIG. 20 is a diagram showing an example of multi-fan-out circuit.

The multi-fan-out circuit 50 produces from the single input current x a plurality of (four in the present embodiment) currents x which are identical with the input current in value and direction. FIG. 20 shows a specific example of such circuit. This circuit comprises a current mirror 58 for reversing the direction of the input current and a multi-output (multi-drain) current mirror 59 connected to the output side of the mirror 58 for producing a plurality of (four) output currents having the same value as the input current but opposite thereto in direction.

The four output currents of the multi-fan-out circuit 50 are fed to the Z function circuits 51, 52 and the S function circuits 53, 54, respectively. The Z function circuits 51, 52 are identical with the one shown in FIG. 5, have break points $Z_{B1}$ and $Z_{B2}$ and deliver output currents $f_{ZX1}$ and $f_{ZX2}$, respectively. The S function circuits 53, 54 are identical with the one shown in FIG. 9, have break points $S_{B1}$ and $S_{B2}$ and delivery output currents $f_{SX1}$ and $f_{SX2}$, respectively. Accordingly, the S functions and Z functions are 1 and $-1$, repsectively, in slope.

Figure 21:
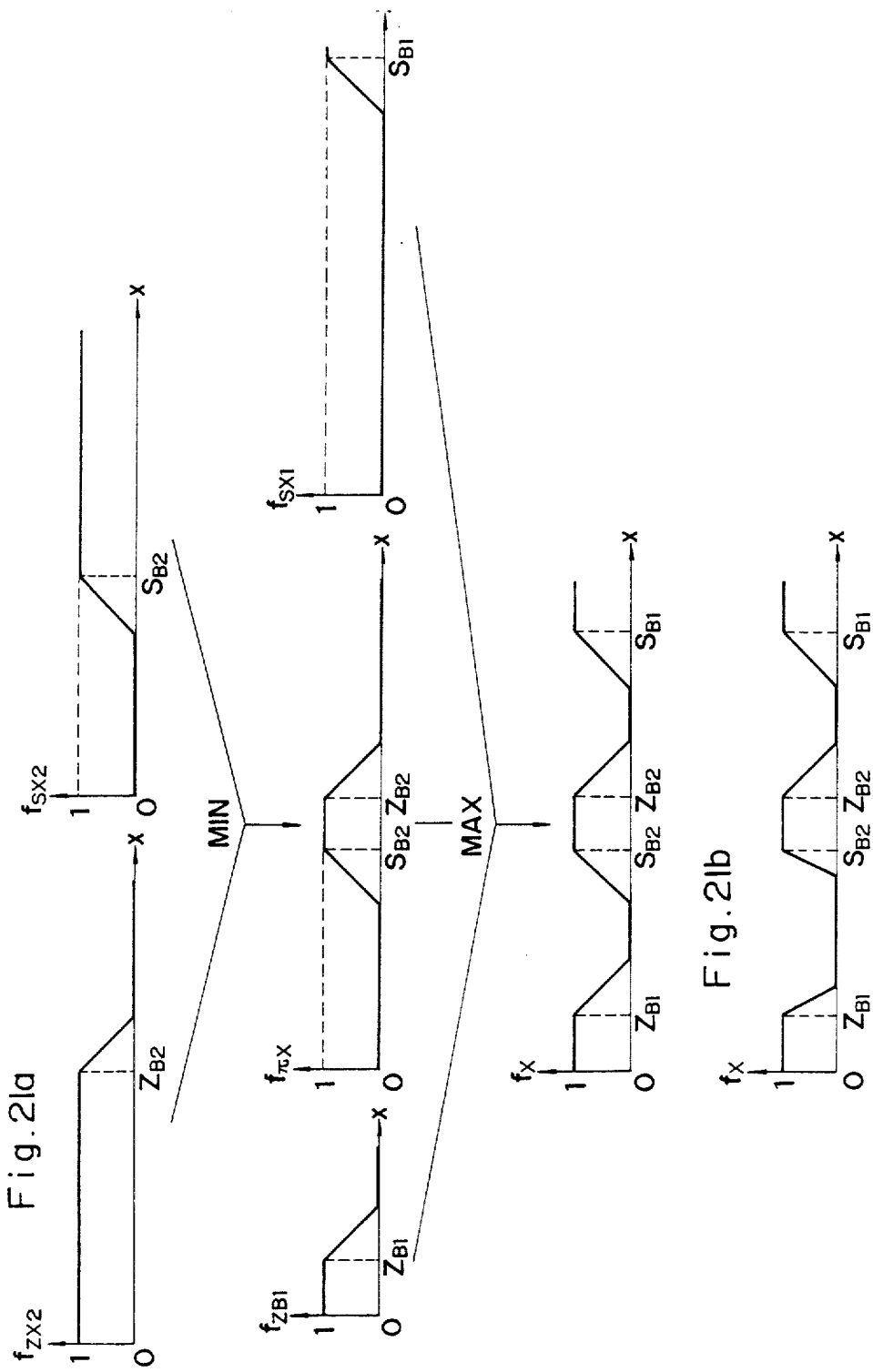
FIG. 21a shows how a W function is produced by the fuzzy MIN calculation and fuzzy MAX calculation of a Z function and S function.
FIG. 21b is a graph showing a W function of changed slope.

The output $f_{ZX2}$ of the second Z function circuit 52 and the output $f_{SX2}$ of the second S function circuit 54 are fed to the MIN circuit 55. When the break points of these circuits 52 and 54 fulfill the condition of $S_{B2} \leq Z_{B2}$, the result of MIN calculation of the outputs of these circuits provides a trapezoidal function, i.e. $\pi$ function as shown in FIG. 21a. The $\pi$ function (output of the MIN circuit 55) is represented by $f_{\pi x}$. The reason is that of the plurality of input values (two input values, here), the smallest (the smaller) is selected by MIN calculation.

The output $f_{\pi x}$, the output $f_{ZX1}$ of the first Z function circuit 51 and the output $f_{SX1}$ of the first S function circuit 53 are given to the MAX circuit 56. MAX is a calculation for selecting the greatest from among a plurality of input values. Suppose $I_0$ is a current value corresponding to grade 1 of the function. With reference to FIG. 21a again, the output of the MAX circuit 56 represents a W function when the break points are so selected as to fulfill the conditions of $Z_{B1}+2I_0 \leq S_{B2}$ and $Z_{B2} \leq S_{B1}-2I_0$.

The current mirrors (indicated at 25 in FIG. 5 or at 35 in FIG. 9) of the function circuits 51 to 54 can be replaced by slope-changeable current mirrors (e.g. the current mirror 25A of FIG. 15). The control signals to be given to the control terminals in this case are indicated at $V_{Z1}$, $V_{Z2}$, $V_{S1}$ and $V_{S2}$ in FIG. 19. The desired one of the four slopes of the W function is then independently changeable to a value other than 1 by setting the level of these control signals, as shown for example in FIG. 21b, in which $V_{Z1}=V_{S2}=H$ and $V_{Z2}=V_{S1}=L$. The slope is of course changeable for the desired one of the functions to be stated below.

The circuit of FIG. 19 realizes nine fuzzy membership functions in accordance with the setting of the break point values as will be described below with reference to FIGS. 4a, 4b and 21a.

In the following description, $H_I$ means a value greater than the maximum value of the input current plus the above-mentioned $I_0$ (e.g. 10 μA), i.e. the maximum input current value $+I_0$, and $L_I$ means a value of up to $-I_0$. D.C. stands for "don't care," meaning that the break point is settable to any value.

The conditions for the circuit of FIG. 19 to realize each of the nine functions are as follows. $\phi$ function $Z_{B1}=L_I$, $S_{B1}=H_I$, $S_{B2}=H_I$, $Z_{B2}=$D.C., or $Z_{B1}=L_I$, $S_{B1}=H_I$, $Z_{B2}=L_I$, $S_{B2}=$D.C.

1 function $Z_{B1}=H_I$, others (i.e. $Z_{B2}$, $S_{B1}$, $S_{B2}$) are D.C. (Although $Z_{B1}$ needs only to be greater than the maximum input current value, the sufficient condition of $Z_{B1}=H_I$ is herein employed so as not to increase the number of different control signals.)

Alternatively, $S_{B1}=L_I$, others D.C. (While $S_{B1}$ needs only to be not greater than 0 A, $S_{B1}=L_I$ is selected to avoid an increase in the number of different control signals.)

Further alternatively, $S_{B2}=L_I$, $Z_{B2}=H_I$, others D.C. (Similarly, $S_{B2}$ needs only to be up to 0 A, and $Z_{B2}$ needs only to be not smaller than the maximum input current value.)

Z function $S_{B1}=H_I$, $S_{B2}=H_I$, $Z_{B2}=$D.C. (In this case, $Z_{B1}$ is a break point.) Alternatively, $S_{B1}=H_I$, $Z_{B2}=L_I$, $S_{B2}=$D.C. (In this case, $Z_{B1}$ is also a break point.) Further alternatively, $S_{B1}=H_I$, $S_{B2}=L_I$, $Z_{B1}=L_I$, (In this case, $Z_{B2}$ is a break point, while $S_{B2}$ needs only to be up to 0 A.)

S function $Z_{B1}=L_I$, $Z_{B2}=L_I$, $S_{B2}=$D.C. (In this case, $S_{B1}$ is a break point.) Alternatively, $Z_{B1}=L_I$, $S_{B2}=H_I$, $Z_{B2}=$D.C. (In this case, $S_{B1}$ is also a break point.) Further alternatively, $Z_{B1}=L_I$, $S_{B1}=H_I$, $Z_{B2}=H_I$. (In this case, $S_{B2}$ is a break point. $S_{B2}$ needs only to be greater than the maximum input current value.)

$\pi$ function $Z_{B1}=L_I$, $S_{B1}=H_I$, $S_{B2} \geq Z_{B2}$ ($S_{B2}$ and $Z_{B2}$ are break points. If $S_{B2}=Z_{B2}$, the function is triangular as shown in a broken line in FIG. 4a.)

U function $S_{B2}=H_I$, $Z_{B2}=D.C.$, $Z_{B1}+I_0 \geq S_{B1}-I_0(Z_{B1}$ and $S_{B1}$ are break points. When $Z_{B1}+I_0=S_{B1}-I_0$, the function has the form indicated in a broken line in FIG. 4b.)

Alternatively, $Z_{B2}=L_I$, $S_{B2}=D.C.$, $Z_{B1}+I_0 \geq S_{B1}-I_0$.

N function $Z_{B1}=L_I$, $S_{B2} \geq Z_{B2} \geq S_{B1}-2I_0$. ($S_{B2}$, $Z_{B2}$ and $S_{B1}$ are break points.) И function $S_{B1}=H_I$, $Z_{B1}+2I_0 \leq S_{B2} \leq Z_{B2}$. ($Z_{B1}$, $S_{B2}$ and $Z_{B2}$ are break points.)

W function $Z_{B1}+2I_0 \leq S_{B2}Z_{B2} \leq S_{B1}-2I_0$. (As stated above.)

With reference to FIG. 19, it will be readily understood that when the circuit 55 is replaced by a MAX circuit, with the circuit 56 replaced by a MIN circuit, the resulting circuit can realize the nine functions, other than W function, shown in FIGS. 4a and 4b.

MIN circuits and MAX circuits (FIGS. 22 to 28)

The MIN (fuzzy intersection) circuit and the MAX (fuzzy union) circuit included in the programmable multi-membership function circuit of FIG. 19 are described in detail in the foregoing U.S. Patent Application filed by the present applicant. These circuits will be described briefly herein.

MIN calculation is defined as follows.

$$\mu_X \cap_Y = \begin{cases} \mu_Y & (\mu_X > \mu_Y) \\ \mu_X & (\mu_X \leq \mu_Y) \end{cases} \quad (5)$$

wherein each of $\mu_X$ and $\mu_Y$ represents a membership function.

Figure 22:
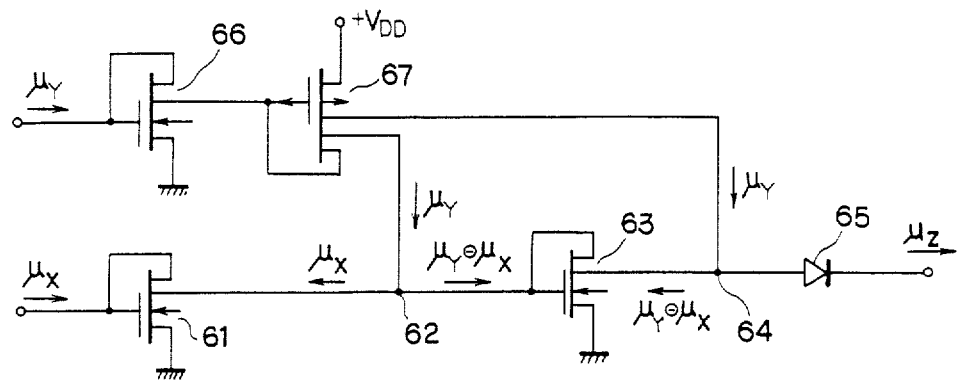
FIG. 22 is a diagram showing a MIN circuit comprising MOS FETs.

FIG. 22 shows a MI circuit comprising MOS FETs. For the sake of convenience, input currents are represented by $\mu_X$ and $\mu_Y$, and an output current (result of MIN calculation) is given by $\mu_Z$.

The input current $\mu_X$ has its direction reversed by a current mirror 61. The input current $\mu_Y$ is fed to a multi-fan-out circuit comprising current mirrors 66 and 67, whereby two currents $\mu_Y$ of equal values are produced.

An outflow input current $\mu_X$ and inflow input curernt $\mu_Y$ are given to a wired OR 62 which is connected to a current mirror 63. The current mirror 63 acts also as a diode, and the wired OR 62 and the current mirror 63 provide a fuzzy bounded-difference circuit. Accordingly, the inflow output current of the current mirror 63 is given by the following formula.

$$\mu_Y \ominus \mu_X = \begin{cases} \mu_Y - \mu_X & (\mu_Y \geq \mu_X) \\ 0 & (\mu_Y < \mu_X) \end{cases} \quad (6)$$

Similarly, a wired OR 64 and a diode 65 provide a bounded-difference circuit, and the MIN circuit produces an outflow output current defined by the following formula.

$$\mu_Z = \begin{cases} \mu_Y - (\mu_Y - \mu_X) = \mu_X & (\mu_Y \geq \mu_X) \\ \mu_Y - 0 = \mu_Y & (\mu_Y < \mu_X) \end{cases} \quad (7)$$

The formula (7) is the same as the formula (5).

Figure 23:
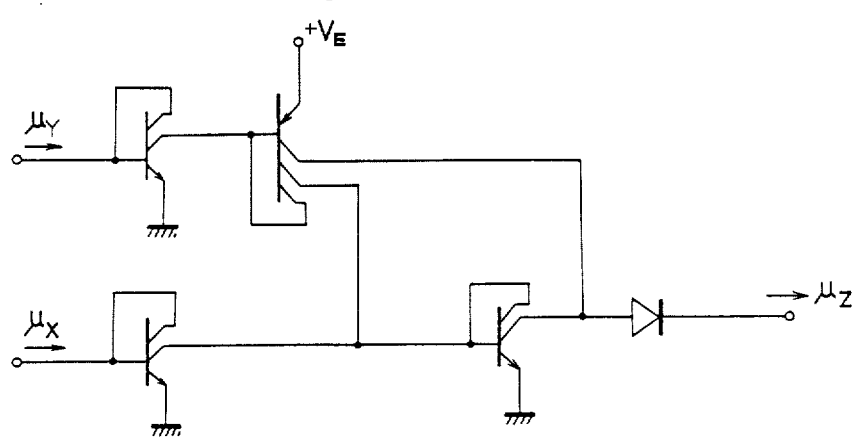
FIG. 23 shows a MIN circuit comprising bipolar transistors for measuring input-output characteristics.

FIG. 23 shows a MIN circuit comprising bipolar transistors. Comparison of this circuit with the circuit of FIG. 22 readily shows that the circuit of FIG. 23 performs MIN calculation.

Figure 24:
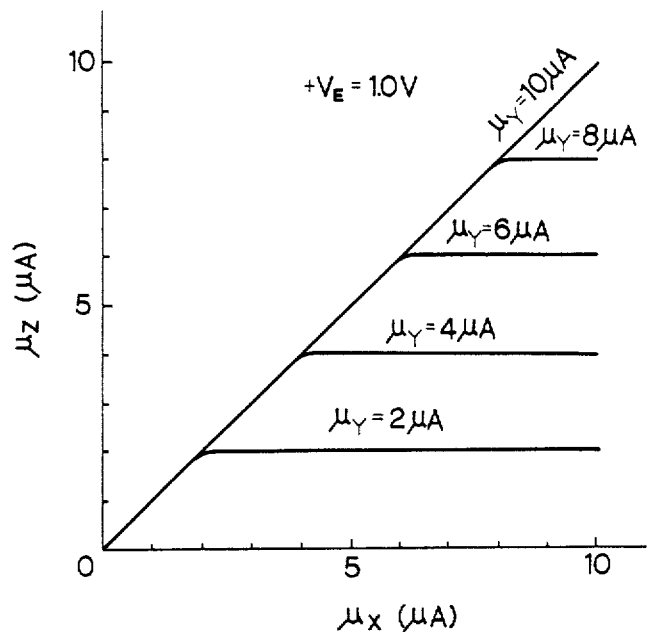
FIG. 24 is a graph showing the input-output characteristics measured.

FIG. 24 shows the input-output characteristics of the circuit of FIG. 23 measured during the input $\mu_Y$ as a parameter. The circuit of FIG. 23 includes TA57 serving as a PNP transistor and TA78 as an NPN transistor.

Figure 25:
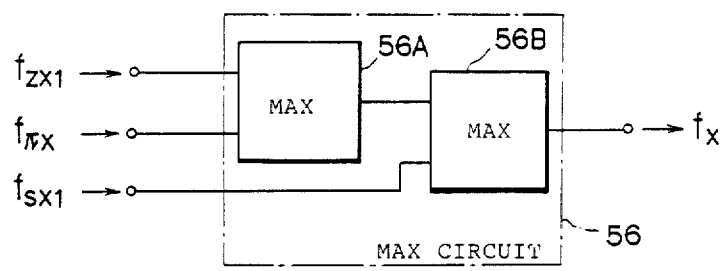
FIG. 25 is a block diagram showing a three-input MAX circuit comprising two two-input MAX circuits in combination.

The MAX circuit 56 of FIG. 19 is given three inputs. Generally, two-input circuits can be constructed easily. The three-input circuit can be prepared by connecting two-input MAX circuits 56A and 56B in two stages as illustrated in FIG. 25.

Figure 26:
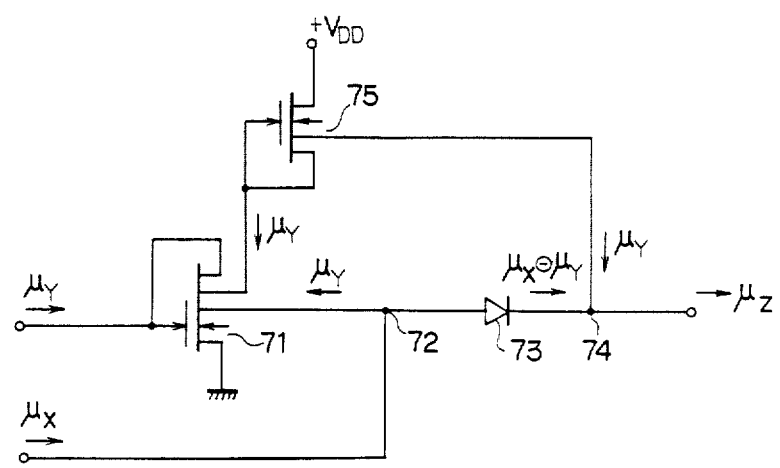
FIG. 26 is a diagram showing a MAX circuit comprising MOS FETs.

FIG. 26 shows two-input MAX circuit (56A or 56B) comprising MOS FETs.

Fuzzy MAX calculation is defined by the following formula.

$$\mu_X \cup_Y = \begin{cases} \mu_X & (\mu_X > \mu_Y) \\ \mu_Y & (\mu_X \leq \mu_Y) \end{cases} \quad (8)$$

An input current $\mu_Y$ is fed to a two-output current mirror 71, which produces two currents $\mu_Y$ opposite to the input current in direction. One of the output currents is fed to a wired OR 72, while the other current has its direction reversed again by a current mirror 75 and is fed to a wired OR 74.

An input current $\mu_X$ is also fed to the wired OR 72. The wired OR 72 and a diode 73 constitute a bounded-difference circuit. A current defined by the following formula flows from the diode 73 into the wired OR 74.

$$\mu_X \ominus \mu_Y = \begin{cases} \mu_X - \mu_Y & (\mu_X > \mu_Y) \\ 0 & (\mu_X \leq \mu_Y) \end{cases} \quad (9)$$

At the wired OR 74, the current $\mu_Y$ is added to the current $\mu_X \ominus \mu_Y$. The output current consequently obtained is defined by the following formula.

$$\mu_Z = \begin{cases} \mu_X - \mu_Y + \mu_Y = \mu_X & (\mu_X > \mu_Y) \\ 0 + \mu_Y = \mu_Y & (\mu_X \leq \mu_Y) \end{cases} \quad (10)$$

The formula (10) has the same meaning as the formula (8).

Figure 27:
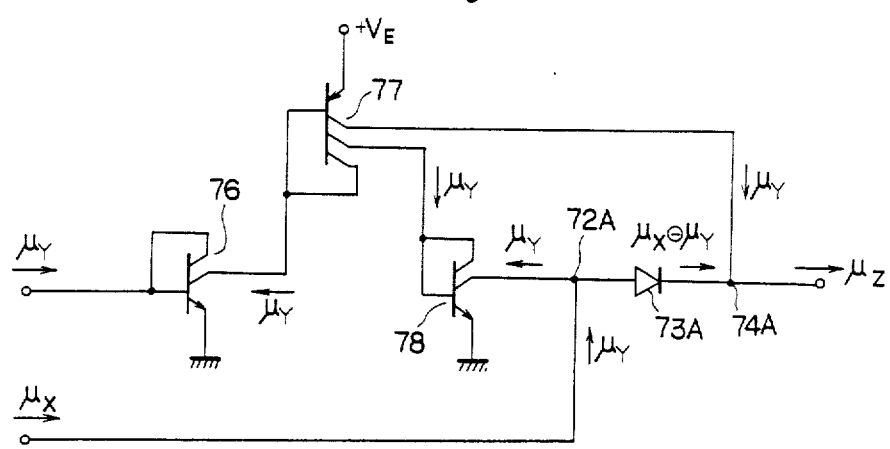
FIG. 27 shows a MAX circuit comprising bipolar transistors for measuring input-output characteristics.

FIG. 27 shows a MAX circuit comprising bipolar transistors. In FIG. 27, the components corresponding to those shown in FIG. 26 individually are referred to each by the same corresponding numeral with an adscript A. The circuit of FIG. 27 does not completely correspond to the circuit of FIG. 26; the two current mirrors 71 and 75 in FIG. 26 are replaced by three current mirrors 76, 77 and 78 in FIG. 27.

When a multi-output current mirror comprises a bipolar transistor having a plurality of collectors, a least one of the output collectors, when opened, becomes saturated, producing an error in the output current through the other output collector. To obviate saturation of the collectors of the multi-output current mirror in any case, there is a need to assure some collector-emitter voltage. With the circuit of FIG. 27, the current mirror 78 having low input resistance is connected to the collector of the multi-output current mirror 77 to avoid saturation of the collectors. Japaneses Patent Application No. 59-263386 filed by the present applicant disclosed in detail the measures to be taken for avoiding the saturation of the collectors of multi-output current mirrors.

Figure 28:
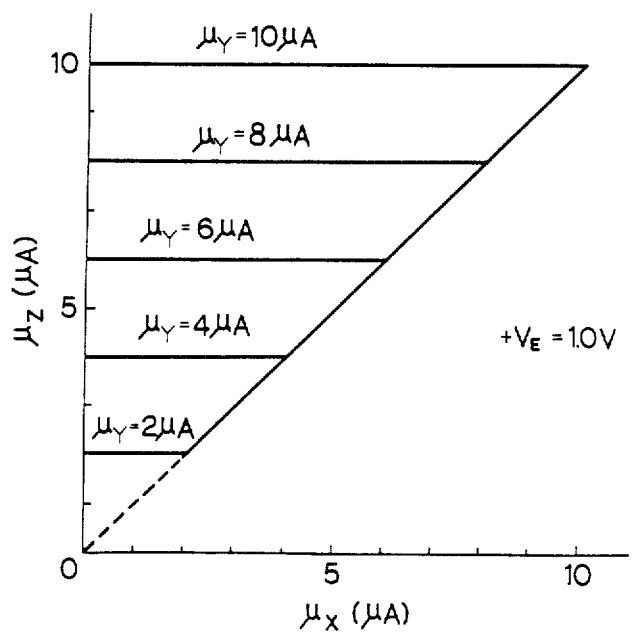
FIG. 28 is a graph showing the input-output characteristics measured.

For illustrative purposes, FIG. 28 shows the input-output characteristics of the MAX circuit of FIG. 27 as determined using the $\mu_Y$ input of the circuit as a parameter.

Simplified programmable multi-membership function circuits (FIGS. 29, 30a, 30b and 30c)

Figure 29:
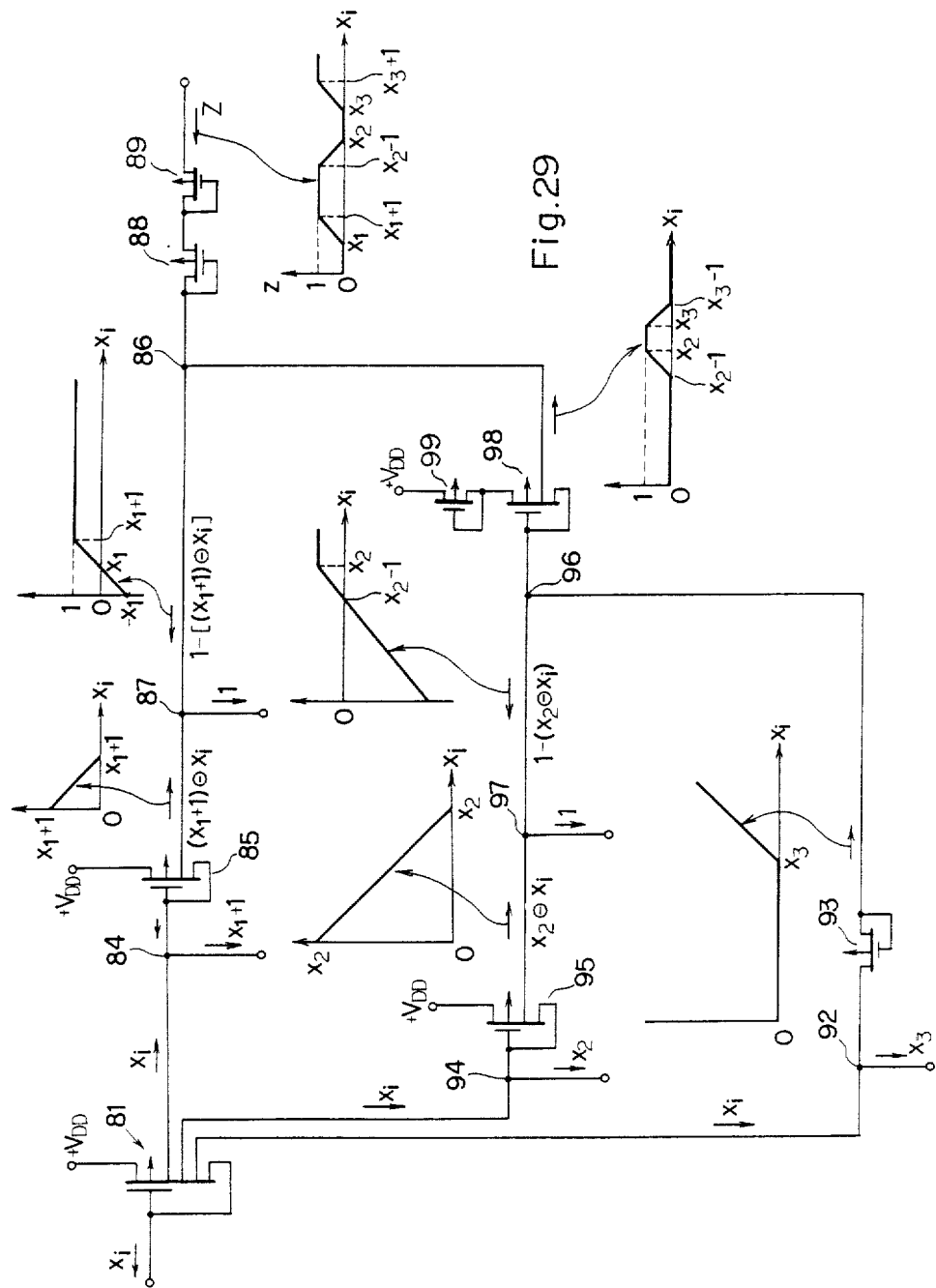
FIG. 29 is a diagram of an example of programmable multi-membership function circuit which is simplied and consists essentially of S function circuits.
Figure 30A:
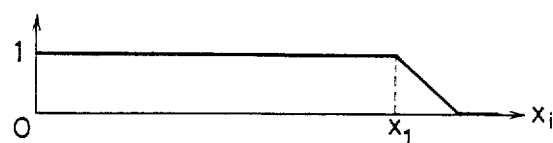
FIGS. 30a, 30b and 30c are graphs showing that a similarly simplified programmable multi-membership function circuit can be composed essentially from Z function circuits.
Figure 30B:
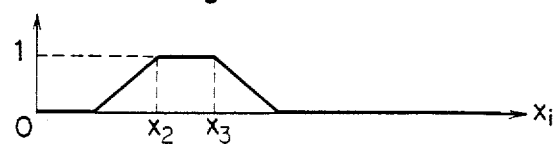
Figure 30C:
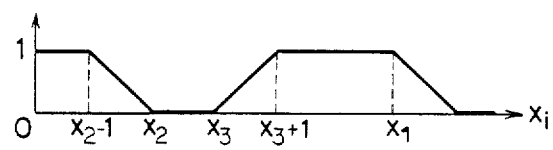

FIG. 29 shows a simplified programmable multi-membership function circuit basically comprising S function circuits and including P-MOS FETs. Accordingly the direction of current is opposite to that in the S function circuit shown in FIG. 9. An input current is represented by $x_i$, and an output current by Z.

The multi-output current mirror 81 produces from the single input current $x_i$ three currents $x_i$ having the same value as the input but opposite thereto in direction. These currents $x_i$ are fed to the following three circuits.

The first of the S function circuit comprises a wired OR 84, a current mirror 85, a wired OR 87 and a diode-connected MOS FET 88. With reference to FIG. 9, these components correspond to the wired OR 34, current mirror 35, wired OR 37 and diode-connected MOS FET 38, respectively. Given to the wired OR 84 is an outflow input current having a value of $x_1 + 1$ and providing a break point. The operation of the first S function circuit will be readily understood with reference to FIG. 9 and to the graphs provided in FIG. 29 in corresponding relation to the arrows showing the direction of currents.

The second S function circuit comprises a wired or 94, current mirror 95, wired OR 97 and current mirror 98. The current mirror 98 acts as a diode and reverses the direction of current. The break point is $x_2$. For the convenience of description, it is assumed that the break point satisfies the condition of $x_2 - 1 \geq x_1 + 1$.

Further provided is a circuit for producing a function (hereinafter referred to as an "upward slope function") whose value increases beyond a break point $x_3$ ($x_3 \geq x_2$) with an upward slope of 1. This circuit comprises a wired OR 92 and a diode-connected MOS FET 93. An outflow input current with the value $x_3$ is given to the wired OR 92.

The output current of the upward slope function circuit is fed to the second S function circuit at a wired OR 96. The output current of the upward slope function circuit is subtracted at the wired OR 96, and the reverse current is blocked by the current mirror 98, so that the output current of the current mirror 98 represents a $\pi$ function (break points: $x_2$ and $X_3$).

The current representing the $\pi$ function is fed to the first S function circuit at a wired OR 86 and is subtracted from the current flowing through the OR. Consequently, the output current Z has a form corresponding to the S function minus the $\pi$ function to represent an N function.

The circuit of FIG. 29 further includes diode-connected MOS FETs 99 and 89 having the following function. The sum of the source-gate threshold voltages of the current mirror 98 and the diode-connected MOS FET 99 is applied across the source of the current mirror 81 and the drain of the MOS FET 93 to permit normal operation of these members. Further the sum of the source-drain threshold voltages of the two diode-connected MOS FETs 88, 89 is applied across the source of the MOS FET 99 and the drain of the current mirror 98 to assure normal operation.

Of the foregoing ten functions, the seven functions other than N function, W function and M function can be realized by the circuit of FIG. 29 under the following conditions.

$\phi$ function $x_1 = H_I$, $x_2 = x_3$ D.C. ($H_I$ means that the break point is to be set to maximum input current plus $I_0$. $I_0$ is a current value corresponding to grade 1. In the case of $\phi$ function, $x_1$ needs only to be equal to or greater than the maximum input current.)

Alternatively, $x_2 = L_I$, $x_3 = H_I$, $x_1 =$ D.C. ($L_I$ means that the break point is to be set to $-I_0$. In the case of $\phi$ function, $x_2 \leq 0$, and $x_3 \geq$ maximum input current.)

1 function $x_1 = L_I$, $x_2 = H_I$, $x_3 =$ D.C. Alternatively, $x_1 = L_I$, $x_3 = L_I$, $x_2 =$ D.C.

Z function $x_1 = L_I$, $x_3 = H_I$ ($x_3 \leq$ maximum input current. $x_2 - 1$ is a break point.)

S function $x_2 = H_I$, $x_3 =$ D.C. ($x_1 + 1$ is a break point.) Alternatively, $x_1 = L_I$, $x_2 = L_I$ ($x_2 \leq 0$. $X_3 + 1$ is a break point.)

$\pi$ function $x_3 = H_I$ ($x_3 \geq$ maximum input current. $x_1 + 1$ and $x_2 - 1$ are break points.)

U function $x_1 = L_I$ ($x_2$ and $x_3$ are break points)

N function

The above-mentioned condition, i.e. $x_1 + 2 \leq x_2 \leq x_3 + 2$.

While the circuit of FIG. 29 consists essentially of S function circuits, a simplified programmable multi-membership function circuit can also be realized which is based on a Z function circuit. In this case, the above first S function circuit replaced by a circuit of a Z function having the value shown in FIG. 30a and a break point at $x_1$. Subtraction of the $\pi$ function shown in FIG. 30b from the Z function provides the N function shown in FIG. 30c when $x_2 \leq x_3 \leq x_1 - 1$.

It will be readily understood that of the ten functions already stated, the seven functions other than N function, W function and M function can be realized using varying conditions for $x_1$, $x_2$ and $x_3$ for the circuit.

Figure 31:
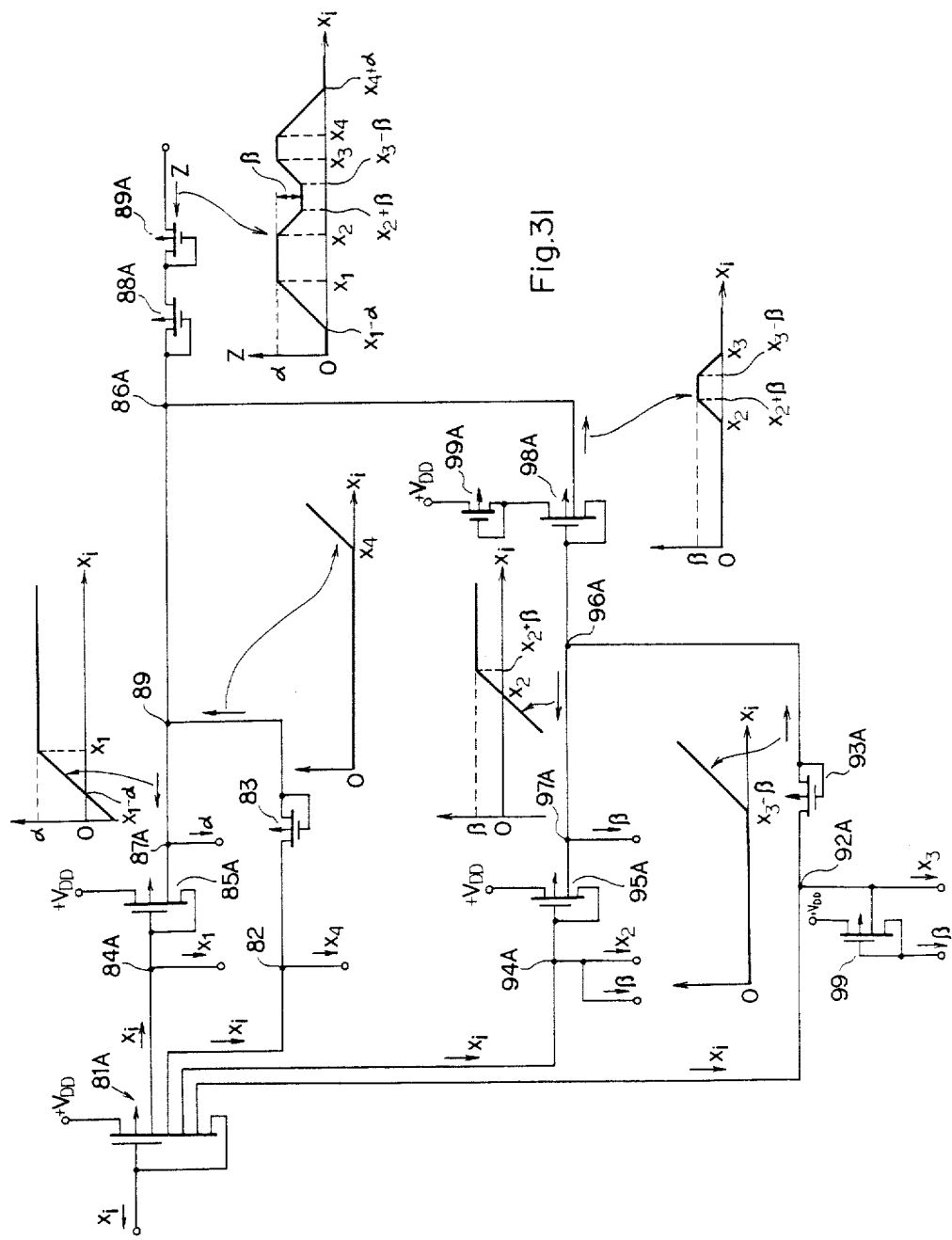
FIG. 31 is a diagram showing an expanded programmable multi-membership function circuit.

Expanded programmable multi-membership function circuits (FIGS. 31 to 33)

FIG. 31 shows a circuit obtained by expanding the membership function circuit of FIG. 29. The expansion has two meanings, one of which is the provision of two kinds of grades, $\alpha$ and $\beta$. With all the circuits already described, the maximum grade is always fixed to 1, whereas the values $\alpha$ and $\beta$ which are variable over the range of 1 to 0 are now prepared as new grade parameters. Another meaning is the provision of a new type of membership function, so to speak a modified M function, with the introduction of the new parameters as will be apparent also from the graph included in FIG. 31 and showing the output current Z of the circuit.

In FIG. 29 and FIG. 31, like parts are designated by like reference numerals except that an adscript A is used in the latter. A description will be given only of the features of the expanded circuit different from the circuit of FIG. 29.

A multi-output current mirror 81A produces four input currents $x_i$.

In the first S function circuit, an outflow input current with a value of $x_1$ is given to a wired OR 84A. A wired OR 87A is given an outflow input current with a value of $\alpha$.

An output current from a newly provided upward slope function circuit (first upward slope function circuit) flows into a new wired OR 89 between two wired ORs 87A and 86A of the first S function circuit. The first upward slope function circuit comprises a wired OR 82 and a diode-connected MOS FET 83 and has a break point of $x_4$.

Accordingly the first S function circuit and the first upward slope function circuit produce a first $\pi$ function (break points: $x_1$ and $x_4$, grade: $\alpha$)

An outflow input current $x_2+\beta$ is given to a wired OR 94A of the second S function circuit, while an outflow input current $\beta$ is given to a wired OR97A.

The S function circuit is provided with an upward slope function circuit (second upward slope function circuit) including a wired OR 92A, to which an outflow input current $x_3-\beta$ is given. A current mirror 99 is provided for converting an outflow input $\beta$ to an inflow input.

Three input currents with a value of $\beta$, which are fed to the wired ORs 94A, 97A and 92A, can of course be produced by a multi-current mirror (not shown).

The second S function circuit and the shown upward slope function circuit produce a second $\pi$ function having a break point at $x_2+\beta$ and $x_3-\beta$ and a grade of $\beta$.

The second $\pi$ function is subtracted from the first $\pi$ function at the wired OR 86A, giving an M function which s $\alpha$ in maximum grade and has a middle recess with a grade of $\beta$, when $\alpha \geq \beta$, $x_1 \leq x_2$ and $x_2 + 2\beta \leq x_3 \leq x_4$.

The circuit of FIG. 31 can be so controlled that of the foregoing ten functions, nine functions other than W function can be produced. Modifications of these functions can also be prepared owing to the provision of $\alpha$ and $\beta$.

For reference, the sufficient conditions for preparing seven functions, other than $\phi$ function and 1 function included in the nine functions, are given below.

Z function
$x_1 = x_2 = x_3 = L_I$, $\alpha = 1$, $\beta = $ D.C. ($x_4$ is a break point.)
Alternatively, $x_1 = L_I$, $\alpha = 1$, $\beta = 1$, $x_3 = x_4 = H_I$($x_2$ is a break point.)
S function
$x_2 = x_3 x_4 = H_I$, $\alpha = 1$, $\beta = $ D.C. ($x_1$ is a break point.)
Alternatively, $x_1 = x_2 = L_I$, $\alpha = \beta = 1$, $x_4 = H_I$($x_3$ is a break point.)
$\pi$ function
$\alpha = 1$, $\beta = 0$, $x_2 = x_3 = $ D.C. ($x_1$ and $x_4$ are break points.)
Alternatively, $x_3 = x_4 = H_I$, $\alpha = \beta = 1$ ($x_1$ and $x_2$ are break points.) Further alternatively, $x_1 = x_2 L_I$, $\alpha = \beta = 1$ ($x_3$ and $x_4$ are break points.)
U function
$x_1 = L_I$, $x_4 = H_I$, $\alpha = \beta = 1$ ($x_2$ and $x_3$ are break points.)
N function
$x_4 = H_I$, $\alpha = \beta = 1$ ($x_1$, $x_2$ and $x_3$ are break points.)
U function
$x_2 = L_I$, $\alpha = \beta = 1$ ($x_2$, $x_3$ and $x_4$ are break points.)
M function
$\alpha \leq x_1 \leq x_2$, $x_2 + 2\beta \leq x_3 \leq x_4$, $\alpha = \beta = 1$ ($x_1$, $x_2$, $x_3$ and $x_4$ are break points.)

While the circuit of FIG. 31 is based also on S functions, an expanded programmable multi-membership function circuit can of course be realized based on Z functions.

The circuit of FIG. 31 is modified into the circuit of FIG. 32, such that one of slopes 1 and 2 is selectable. The current mirrors 85A and 95A in FIG. 31 are replaced by slope-changeable current mirrors 85B and 95B, respectively. These current mirrors 85B and 95B are the same as the current mirror 25A in FIG. 15.

The diode-connected FETs 83 and 93A are also replaced by slope-changeable current mirrors 83B and 93B, which are respectively preceded by current mirrors 93C and 93C for altering the direction of current.

For simplicity, currents $x_2$ and $x_3$ are given to wired OR 94A and 92A, respectively.

The current mirrors 85B, 93B, 95B and 93B comprise a P-MOS FET, so that when control voltage signals $V_{C1}$ to $V_{C4}$ therefor are changed to L level, the switching FETs are turned on to give a slope of 2 or $-2$ and produce an output current Z of the form indicated in broken lines in FIG. 33. The control voltages $V_{C1}$ to $V_{C4}$ are of course adjustable independently of one another.

Figure 34:
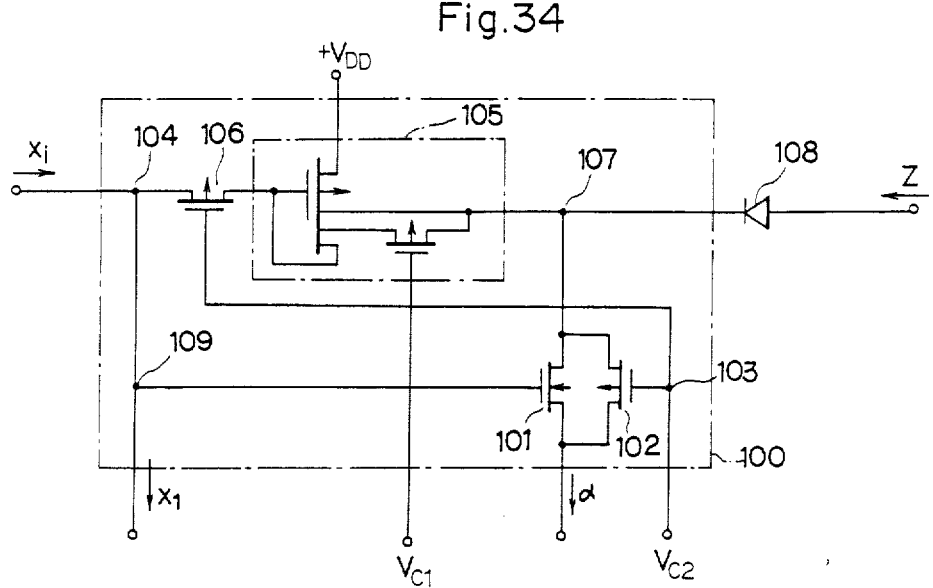
FIG. 34 is a diagram showing an S function circuit applicable to a crisp set.
Figure 35:
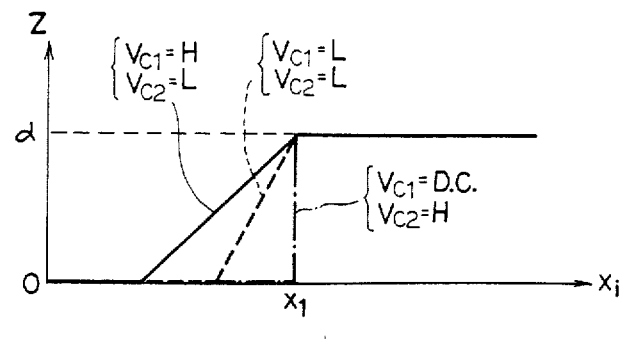
FIG. 35 is a graph showing the input-output characteristics of the circuit.

S function circuit applicable to crisp set (FIGS. 34 and 35)

FIG. 34 shows a circuit which is an improvement over the S function circuit (of FIG. 9 or 32), for application to a crisp set. The improved circuit includes a slope changing circuit. With reference to FIG. 34 in comparison with FIG. 9 (or FIG. 32), a wired OR 104 corresponds to the OR 34 (or 84A), a changeable current mirror 105 to the mirror 35 (or 85B), a wired OR 107 to the OR 37 (or 87A) and a diode 108 to the diode-connected FET 38 (or 88A). The slope is changed by a control signal $V_{C1}$.

Accordingly, additionally provided in the circuit are a P-MOS FET 106 serving as a switching device and connected between the wired OR 104 and a current mirror 105, and an N-MOS FET 101 and a P-MOS FET 102 connected to each other in parallel, serving as switching devices and connected between the wired OR 107 and a current source (not shown) having a value $\alpha$. The FETs 102 and 106 are on-off controlled by a control signal $V_{C2}$. The FET 101 is controlled by the potential at a junction 109 which is provided between the wired OR 104 and a current source (not shown) having a value of $x_1$. In accordance with the value of current flowing into or out of the junction 109, the potential changes to H or L level.

In a fuzzy set, whether a member belongs to the set is expressed in degree, i.e. in terms of a continuous value of 1 to 0. Accordingly, the membership function representing the degree has a slope portion as already described. In the case of a crisp set, in contrast, whether a member belongs to the set is manifestly expressed by 1 or 0. The membership function of the crisp set has a portion of discrete change from 1 to 0 or from 0 to 1 (i.e. portion of infinite slope).

With reference to FIG. 34 again, when the control voltage $V_{C2}$ is at L level, the two FETs 102 and 106 are on. Since the FET 101 is connected in parallel with the FET 102, the circuit of FIG. 34 functions as a fuzzy set membership S function circuit irrespective of whether the FET 101 is on or off. The slope is 1 if the control voltage $V_{C1}$ is H, or 2 if the voltage is L. The input-output characteristics of the circuit at this time are indicated in a solid line and a broken line in FIG. 35.

When the control voltage $V_{C2}$ changes to H level, both the FETs 106 and 102 are turned off. When the FET 106 is off, the input current $x_i$ flows toward the function 109 via the wired OR 104 without flowing into the current mirror 105. When the FET 102 is off, whether the outflow input current α is given to the wired OR 107 is dependent on the state of the FET 101.

If $x_i < x_1$, the potential at the junction 109 is at L level, and the FET 101 is off. Consequently, the output current Z is 0. When $x_i \geq x_1$, the junction 109 is at H level, and the FET 101 is on. The current α flows through the FET 101 from the wired OR 107. Since the output current of the current mirror 105 is 0, the output current Z is consequently equal to α. Thus, when $x_i = x_1$, an output Z inverting from 0 to 1 is obtained as indicated in a dot-and-dash line in FIG. 35. When the control voltage $V_{C2}$ is at H level, the control voltage $V_{C1}$ may be either at H or L level.

The only difference between S function circuit and Z function circuit is that the direction of current determining the break point as mentioned above differs. Accordingly, a Z function circuit applicable to a crisp set can be similarly obtained based on the same concept as the circuit of FIG. 34 and suitably selecting MOS FETs of P type or N type as components.

The circuit 100 surrounded by a dot-and-dash line except for the diode 108 will be mentioned later with reference to FIG. 38 as the main portion of the S function circuit.

Figure 36:
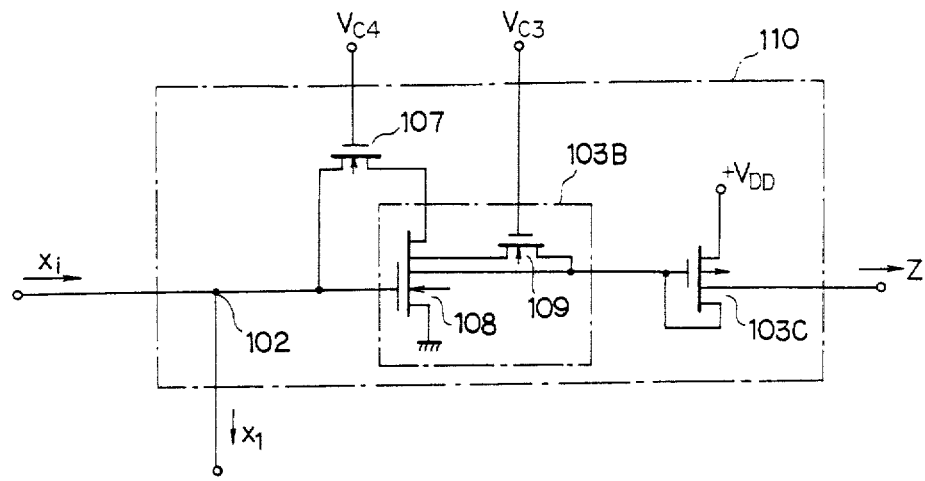
FIG. 36 is a diagram showing an upward slope function circuit applicable to a crisp set.
Figure 37:
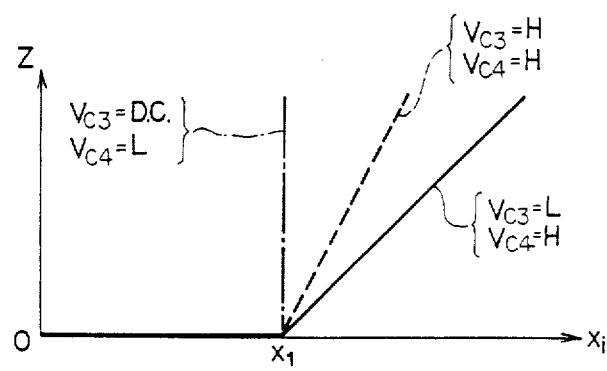
FIG. 37 is a graph showing the input-output characteristics of the circuit.

Upward slope function circuit applicable to crisp set (FIGS. 36 and 37)

FIG. 36 shows a circuit which is obtained by improving the upward slope function circuit shown in FIG. 32 and having a slope changing function (i.e. the circuit comprising the wired OR 82, current mirror 83C and slope changeable current mirror 83B, or the circuit comprising the wired OR 92A, current mirror 93C and slope changeable current mirror 93B), so as to render the circuit applicable to a crisp set.

With reference to FIGS. 36 and 32, a wired OR 102 corresponds to the OR 82 (or 92A), a current mirror 103C to the mirror 83C (or 93C) and a slope changeable current mirror 103B to the mirror 83B (or 93B). However, the current mirror 103C and the slope changeable current mirror 103B are connected together as arranged in reverse relation to the arrangement of the current mirror 83C (or 93C) and the slope changeable current mirror 83B (or 93B). Further the P type and N type FETs are replaced by each other for constituting these current mirrors. The slope changeable current mirror 103B comprises a current mirror 108 having two output drains and an FET 109 for switching one of the drains. The FET 109 is on-off controlled by a control signal $V_{C3}$. An N-MOS FET 107 for opening the gate-connected drain of the current mirror 108 is additionally used. The FET 107 is controlled by a control signal $V_{C4}$.

The construction of the circuit of FIG. 36 will become apparent when compared with the circuit of FIG. 15. The FET 107 and the current mirror 103C only are added to the circuit of FIG. 15.

When the control signal $V_{C4}$ is at H level, this circuit serves the same function as the upward slope circuit shown in FIG. 32 for a fuzzy set. Thus, when $V_{C4}$ is H, the FET 107 is on. At this time, the slope of the output current Z is dependent on the control signal $V_{C3}$, and the circuit exhibits the input-output characteristics indicated in a solid line and a broken line in FIG. 37.

When the control voltage $V_{C4}$ changes to L level, the FET 107 is turned off, whereupon the FET 108 ceases to function as a current mirror, serving merely as an amplifier.

When $x_i < x_1$, no current flows into the gate of FET 108. Consequently, the output current Z is 0.

When $x_i \geq x_1$, with a current even of low value present to flow into the FET 108, the current is amplified to an abruptly increased current which flows toward the output side thereof. Accordingly, the output current Z rises almost vertically at $x_i = x_1$ as indicated in a dot-and-dash line in FIG. 37.

Figure 38:
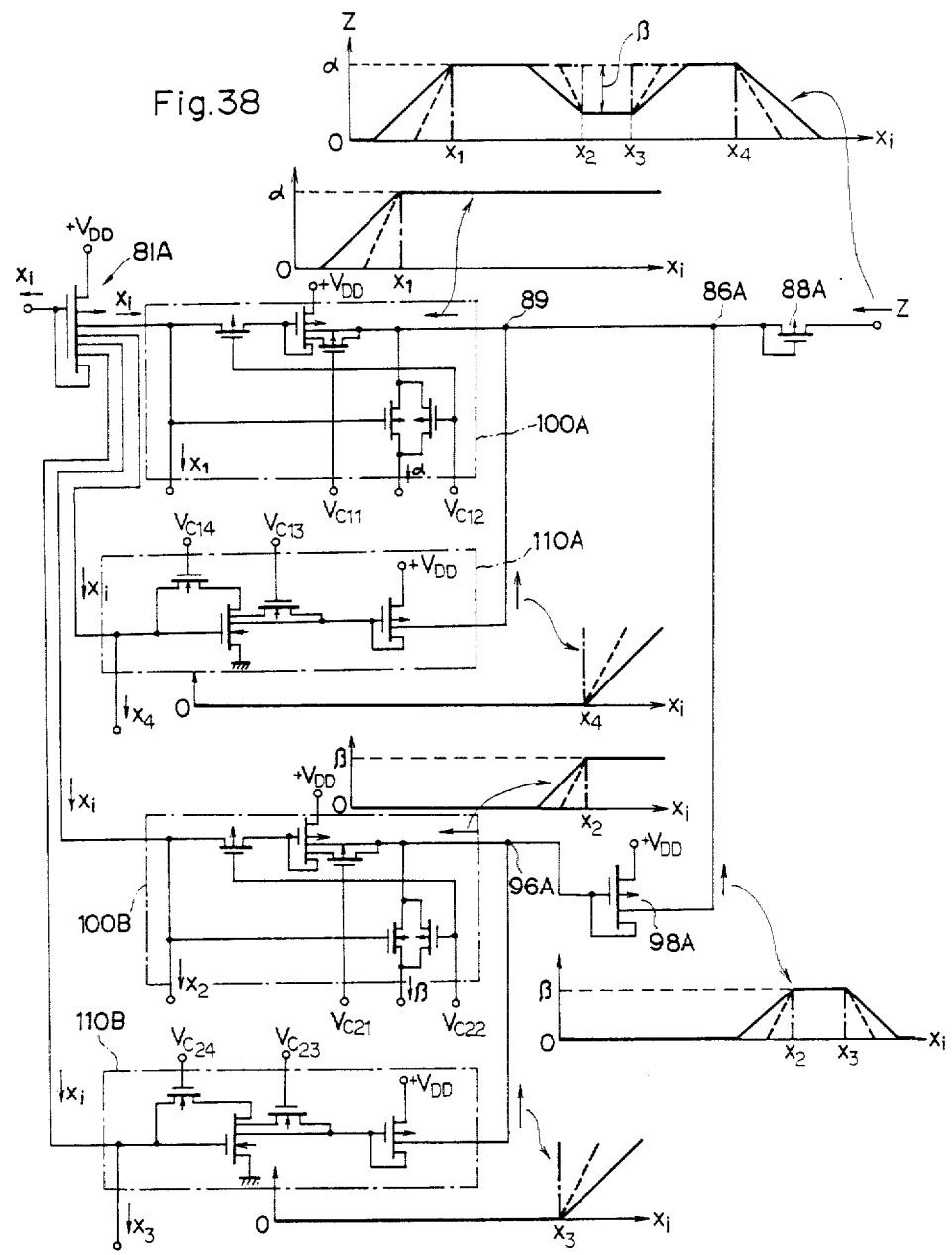
FIG. 38 is a diagram showing a programmable multi-membership function circuit applicable to a crisp set.

The circuit of FIG. 36, which is used in the circuit of FIG. 38, is designated by the reference numeral 110.

Programmable multi-membership function circuit applicable to crisp set (FIG. 38)

FIG. 38 shows a programmable multi-membership function circuit applicable to a crisp set and comprising the main portion 100 of the S function circuit applicable to a crisp set and shown in FIG. 34 and the upward slope function circuit 110 applicable to a crisp set and shown in FIG. 36, as applied to the expanded programmable multi-membership function circuit shown in FIG. 32 to improve the expanded circuit.

In FIGS. 38 and 32, like parts are designated by like reference numerals. Further since two circuits 100 shown in FIG. 34 are used, these circuits are indicated at 100A and 100B. Two circuits 110 of FIG. 36 are also used and are therefore indicated at 110A and 110B.

From the graphs provided in corresponding relation to the arrows indicating the directions of currents through the circuit, it will be readily understood that the circuit of FIG. 38 gives output currents Z representing many types of fuzzy membership functions including M function when the parameters $X_1$ to $x_4$, α and β are varied. The slopes are variable by changing the level of control voltages $V_{C11}$ to $V_{C14}$ and $V_{C21}$ to $V_{C24}$. Furthermore, many types of crisp membership functions can be produced.

What is claimed is:

1. A fuzzy logic circuit for use in composing a desired fuzzy membership function, comprising:
   a plurality of fuzzy membership function basic circuits comprising means for outputting signals representing respective basic fuzzy membership functions, and
   a circuit including a MIN circuit and a MAX circuit, to which the output signals of said basic circuits are fed, comprising means for producing a signal representing said desired fuzzy membership function based on a MIN/MAX operation of said output signals of said basic circuits.

2. A programmable multi-membership function circuit comprising:
   at least one Z function circuit,
   at least one S function circuit, and
   a fuzzy logic circuit for calculating fuzzy logic from the output of the Z function circuit and the output of the S function circuit.

3. A circuit as defined in claim 2 further comprising a multi-fan-out circuit for giving inputs of the same value to the Z function circuit and the S function circuit.

4. A circuit as defined in claim 2 wherein the fuzzy logic circuit is a MIN circuit for giving at least a π function output.

5. A circuit as defined in claim 2 wherein the fuzzy logic circuit is a MAX circuit for giving at least a U function output.

6. A circuit as defined in claim 2 wherein the fuzzy logic circuit comprises a MIN circuit and a MAX circuit, and the output of a first Z function circuit and the output of a first S function circuit are given to the MIN circuit as its inputs, the output of a second Z function circuit, the output of a second S function circuit and the output of the MIN circuit being given to the MAX circuit as its inputs.

7. A circuit as defined in claim 2 wherein the fuzzy logic circuit comprises a MIN circuit and a MAX circuit, and the output of a first Z function circuit and the output of a first S function circuit are given to the MAX circuit as its inputs, the output of a second Z function circuit, the output of a second S function circuit and the output of the MAX circuit being given to the MIN circuit as its inputs.

8. A fuzzy membership function circuit applicable to a crisp set comprising:
   a bounded-difference circuit comprising a first subtraction circuit for conducting subtraction between an input current and a current representing a value relating to a break point and a current mirror connected to the output side of the subtraction circuit,
   a second subtraction circuit for subtracting the output current of the bounded-difference circuit from a current representing a specified grade,
   a first switching device provided at a suitable location between the first subtraction circuit and the second subtraction circuit,
   a second switching device provided between an input terminal for the grade representing current and the second subtraction circuit and on-off controllable simultaneously with the first switching device,
   a third switching device connected in parallel with the second switching device, and
   a current comparison circuit for comparing the input current with the current representing the break point relating value and controlling the third switching switching device in accordance with the result of comparison.

9. A circuit as defined in claim 8 wherein the current mirror of the bounded-difference circuit comprises a multi-output current mirror having a plurality of output lines connected in parallel therewith, and a fourth switching device provided on at least one of the output lines.

10. A circuit as defined in claim 8 wherein a diode function device is connected to the output side of the second subtraction circuit.

11. A fuzzy membership function circuit applicable to a crisp set comprising:
   a bounded-difference circuit comprising a subtraction circuit for conducting subtraction between an input current and a current representing a value relating to a break point and a current mirror connected to the output side of the subtraction circuit, and
   a switching device for opening a short-circuiting channel between the output and input of the current mirror to render the current mirror serviceable as an amplifier.

12. A circuit as defined in claim 11 wherein the current mirror of the bounded-difference circuit comprises a multi-output current mirror having a plurality of output lines connected in parallel therewith, and a second switching device provided on at least one of the output lines.

13. A programmable multi-membership function circuit comprising:
   a basic membership function circuit for producing a current retaining a first grade value over a given range of input current,
   a $\pi$ function circuit for producing a current representing a membership $\pi$ function having a second grade, and
   a subtraction circuit for subtracting the output current of the $\pi$ function circuit from the output current of the basic membership function circuit.

14. A circuit as defined in claim 13 wherein the basic membership function circuit is an S function circuit.

15. A circuit as defined in claim 13 wherein the basic membership function circuit is a Z function circuit.

16. A circuit as defined in claim 13 wherein the basic membership function circuit is a $\pi$ function circuit.

17. A circuit as defined in claim 13 wherein the basic membership function circuit and the $\pi$ function circuit are variable in slope.

18. A circuit as defined in claim 13 wherein the slope portions of the basic membership function circuit and the $\pi$ function circuit are selectively changeable so as to rise or fall substantially vertically.

* * * * *